(12) United States Patent
Chen et al.

(10) Patent No.: US 10,547,543 B2
(45) Date of Patent: *Jan. 28, 2020

(54) ELEGANT TEMPORAL LABEL SWITCHED PATH TUNNEL SERVICE CONTROLLER

(71) Applicant: Futurewei Technologies, Inc., Plano, TX (US)

(72) Inventors: Huaimo Chen, Bolton, MA (US); Renwei Li, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/187,384

(22) Filed: Jun. 20, 2016

(65) Prior Publication Data

US 2016/0380889 A1 Dec. 29, 2016

Related U.S. Application Data

(60) Provisional application No. 62/183,979, filed on Jun. 24, 2015.

(51) Int. Cl.
*H04L 12/46* (2006.01)
*H04L 12/723* (2013.01)

(52) U.S. Cl.
CPC .......... *H04L 45/50* (2013.01); *H04L 12/4633* (2013.01)

(58) Field of Classification Search
CPC ............................ H04L 45/50; H04L 12/4633
USPC ........................................................ 370/230
See application file for complete search history.

(56) References Cited

U.S. PATENT DOCUMENTS

| 7,319,700 | B1 | 1/2008 | Kompella |
| 8,107,379 | B2 | 1/2012 | Vasseur |
| 8,717,899 | B2 | 5/2014 | Boutros et al. |
| 9,258,210 | B2 | 2/2016 | Torvi |
| 9,819,580 | B2 | 11/2017 | Chen et al. |
| 2002/0176370 | A1 | 11/2002 | Ohba et al. |
| 2004/0042406 | A1 | 3/2004 | Wu et al. |
| 2004/0073650 | A1 | 4/2004 | Nakamura |

(Continued)

OTHER PUBLICATIONS

Chen, et al., "Extensions to PCEP for Temporal LSP," draft-chen-pce-tts-04.txt, Nov. 10, 2016, 26 pages.

(Continued)

*Primary Examiner* — Christopher R Crompton
(74) *Attorney, Agent, or Firm* — Conley Rose, P.C.

(57) ABSTRACT

A method implemented by a network element (NE) configured as a temporal tunnel service (TTS) controller, comprising computing, via a processor of the NE, a path in a network for a temporal label switched path (LSP), wherein the path satisfies a constraint in a scheduled time interval comprising a predetermined start time and a predetermined end time, reserving, at a current time prior to the predetermined start time via the processor, a first network resource on a link along the path computed for the temporal LSP, wherein the first network resource is reserved for the temporal LSP to carry traffic in the scheduled time interval, and sending, at the predetermined start time via a transmitter of the NE, a LSP creation request to a node associated with the temporal LSP to request creation of the temporal LSP along the path in the network.

19 Claims, 24 Drawing Sheets

(56) References Cited

U.S. PATENT DOCUMENTS

| | | | | |
|---|---|---|---|---|
| 2005/0089327 | A1* | 4/2005 | Ovadia | H04L 45/04 398/47 |
| 2006/0013177 | A1* | 1/2006 | Saito | H04L 45/26 370/338 |
| 2006/0101142 | A1* | 5/2006 | Vasseur | H04L 45/04 709/225 |
| 2007/0160061 | A1 | 7/2007 | Vasseur | |
| 2007/0165515 | A1 | 7/2007 | Vasseur | |
| 2008/0123533 | A1 | 5/2008 | Vasseur et al. | |
| 2008/0304501 | A1 | 5/2008 | Park et al. | |
| 2009/0274464 | A1 | 11/2009 | Zi et al. | |
| 2010/0220996 | A1 | 9/2010 | Lee et al. | |
| 2011/0090785 | A1 | 4/2011 | Shimizu et al. | |
| 2012/0092986 | A1 | 4/2012 | Chen | |
| 2012/0147895 | A1 | 6/2012 | Choudhury et al. | |
| 2013/0034103 | A1 | 2/2013 | Chen et al. | |
| 2013/0242977 | A1* | 9/2013 | Tanaka | H04L 12/28 370/351 |
| 2015/0110000 | A1* | 4/2015 | Zhang | H04W 8/04 370/328 |
| 2015/0245392 | A1 | 8/2015 | Chan et al. | |
| 2016/0308786 | A1 | 10/2016 | Chen et al. | |
| 2016/0344626 | A1 | 11/2016 | Chen et al. | |
| 2017/0332423 | A9 | 11/2017 | Iyer et al. | |
| 2018/0019930 | A1* | 1/2018 | Bruno | H04L 41/147 |

OTHER PUBLICATIONS

Chen, et al., "Framework for Temporal Tunnel Services,"draft-chen-teas-frmwk-tts-01.txt, Sep. 22, 2016, 25 pages.
Crabbe, et al., "PCEP Extensions for Stateful PCE," draft-ietf-pce-stateful-pce-14, Sep. 21, 2016, 51 pages.
Chen, et al., "Zone Routing System," U.S. Appl. No. 14/737,142, filed Jun. 11, 2015, 43 pages Specification, 22 pages drawings.
Moy, "OSPF Version 2," RFC 2328, Apr. 1998, 201 pages.
Crabbe,et al., "PCEP Extensions for PCE-Initiated LSP Setup in a Stateful PCE Model," draft-ietf-pce-pce-initiated-lsp-04, Apr. 17, 2015, 17 pages.
Crabbe, et al., "PCEP Extensions for Stateful PCE," draft-ietf-pce-stateful-pce-11, Apr. 20, 2015, 47 pages.
Bradner, "Key Words for Use in RFCs to Indicate Requirement Levels," RFC 2119, Mar. 1997, 3 pages.
Rosen, et al., "Multiprotocol Label Switching Architecture," RFC 3031, Jan. 2001, 61 pages.
Awduche, et al., "RSVP-TE: Extensions to RSVP for LSP Tunnels," RFC 3209, Dec. 2001, 61 pages.
Katz, et al., "Traffice Engineering (TE) Extensions to OSPF Version 2," RFC 3630, Sep. 2003, 14 pages.
Farrel, et al., "A Path Computation Element (PCE)—Based Architecture," RFC 4655, Aug. 2006, 40 pages.
Aggarwal, Ed., et al., "Extensions to Resource Reservation Protocol—Traffic Engineering (RSVP-TE) for Point-to-Multipoint TE Label Switched Paths (LSPs)," RFC 4875, May 2007, 53 pages.
Berger, et al., "The OSPF Opaque LSA Option," RFC 5250, Jul. 2008, 17 pages.
Vasseur, Ed., et al., "Path Computation Element (PCE) Communication Protocol (PCEP)," RFC 5440, Mar. 2009, 87 pages.
Yasukawa, et al., "Path Computation Clients (PCC)—Path Computation Element (PCE) Requirements for Point-to-Multipoint MPLS-TE," RFC 5862, Jun. 2010, 11 pages.
Zhao, Ed., et al., "Extensions to the Path Computation Element Communication Protocol (PCEP) for Point-to-Multipoint Traffic Engineering Label Switched Paths," RFC 6006, Sep. 2010, 33 pages.
Chen, H., et al., "Extensions to MPLS for Temporal LSP draft-chen-teas-rsvp-tts-oo.txt," Internet Engineering Task Force, Standards Track, Jul. 3, 2015, 12 pgs.
Bradner, S., "Key words for use in RFCs to Indicate Requirement Levels," Network Working Group, RFC 2119, Mar. 1997, 3 pgs.
Awduche, D., et al., "RSVP-TE: Extensions to RSVP for LSP Tunnels," Network Working Group, RFC 3209, Dec. 2001, 61 pgs.
Katz, D., et al., "Traffic Engineering (TE) Extensions to OSPF Version 2," Network Working Group, RFC 3630, Sep. 2003, 14 pgs.
Aggarwal, R., Ed., et al., "Extensions to Resource Reservation Protocol—Traffic Engineering (RSVP-TE) for Point-to-Multipoint TE Label Switched Paths (LSPs)," Network Working Group, RFC 4875, May 2007, 53 pgs.
Moy, J., "OSPF Version 2," Network Group Group, RFC 2328, Apr. 1998, 201 pages.
Coltun, R., "The OSPF Opaque LSA Option," RFC 2370, Jul. 1998, 15 pages.
Chen, H., "Extensions to OSPF for Temporal LSP," draft-chen-ospf-tts-00.txt, Jul. 2, 2015, 11 pages.
Office Action dated Oct. 20, 2017, 6 pages, U.S. Appl. No. 15/157,944, filed May 18, 2016.
Notice of Allowance dated Jan. 3, 2018, 9 pages, U.S. Appl. No. 15/157,944, filed May 18, 2016.
Notice of Allowance dated Sep. 1, 2017, 14 pages, U.S. Appl. No. 15/095,748, filed Apr. 11, 2016.
Office Action dated Feb. 22, 2018, 25 pages, U.S. Appl. No. 15/178,151, filed Jun. 9, 2016.
Le Roux, J., "OSPF Protocol Extensions for path Computation Element (PCE) Discovery," RFC 5088, Jan. 2008, 21 pages.
Le Roux, J., "IS-IS Protocol Extensions for Path Computation Element (PCE) Discovery," RFC 5089, Jan. 2008, 18 pages.
Office Action dated Feb. 28, 2019, 27 pages, U.S. Appl. No. 14/846,450, filed Sep. 4, 2015.
Office Action dated Mar. 23, 2017, 28 pages, U.S. Appl. No. 14/846,450, filed Sep. 4, 2015.

* cited by examiner

ELEGANT TEMPORAL LABEL SWITCHED PATH TUNNEL SERVICE CONTROLLER

CROSS-REFERENCE TO RELATED APPLICATIONS

The present application claims priority to U.S. Provisional Patent Application 62/183,979 filed Jun. 24, 2015 by Huaimo Chen, et al., and entitled "Elegant Temporal Label Switched Path Tunnel Service Controller," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a networking paradigm that decouples network control and forwarding functions. The decoupling of the control plane from the data plane allows for centralization of network control, enabling effective policy administration and flexible management. The centralization of network control also facilitates various network functionalities, such as network measurements, traffic engineering, enhanced quality of services, and enhanced access control. With the growing availability of SDN-enabled nodes and protocols, such as OpenFlow, many organizations have started deploying SDN networks.

SUMMARY

In a SDN network, a SDN controller determines routes through the network and configures each node in the network with routing instructions. In a SDN network that employs label switched paths (LSPs) for data transportation, a SDN controller provides a solution for creating LSPs in the network without employing Resource Reservation Protocol (RSVP). Every LSP created by the SDN controller is up forever and network resources are reserved for the LSP forever until the LSP is deleted. However, some LSPs may not be actively carrying traffic at all time. Thus, network resources may not be used efficiently. In addition, the LSPs created by a SDN controller are typically limited to the domain controlled by the SDN controller and may not tunnel through multiple domains. To resolve these and other problems, and as will be more fully explained below, a temporal tunnel service (TTS) controller is used to create temporal LSPs for carrying traffic at one or more particular time intervals according to users' requests and reserve network resources for the temporal LSPs in corresponding time intervals. In addition, the TTS controller coordinates with other TTS controllers or path computation element for temporal tunnel service (PCE-TTS) units to create temporal LSPs that tunnel through multiple domains.

In one embodiment, the disclosure includes a method implemented by a network element (NE) configured as a TTS controller, comprising computing, via a processor of the NE, a path in a network for a temporal LSP, wherein the path satisfies a constraint in a scheduled time interval comprising a predetermined start time and a predetermined end time, reserving, at a current time prior to the predetermined start time via the processor, a first network resource on a link along the path computed for the temporal LSP, wherein the first network resource is reserved for the temporal LSP to carry traffic in the scheduled time interval, and sending, at the predetermined start time via a transmitter of the NE, a LSP creation request to a node associated with the temporal LSP to request creation of the temporal LSP along the path in the network. In some embodiments, the disclosure also includes sending, at the predetermined end time via the transmitter, a LSP deletion request to the node associated with the temporal LSP to request deletion of the temporal LSP from the network, and/or further comprising receiving, via a receiver of the NE, a creation request to create the temporal LSP in the network for carrying the traffic in the scheduled time interval, wherein the creation request indicates the constraint, the predetermined start time, and the predetermined end time, and wherein the path is computed in response to the creation request, and/or wherein the creation request further indicates that the scheduled time interval is a recurring time interval, wherein computing the path in the network comprises determining that the path satisfies the constraint in each recurring time interval, wherein reserving the first network resource comprises reserving the first network resource on the link for each recurring time interval, wherein sending the LSP creation request comprises sending the LSP creation request at a beginning of each recurring time interval, and wherein the method further comprises sending, at an end of each recurring time interval a LSP deletion request to the node to request deletion of the temporal LSP from the network, and/or further comprising allocating, via the processor, a global identifier (ID) for identifying the temporal LSP in the network, and storing, in a memory of the NE, path information associated with the temporal LSP, wherein the path information indicates the global ID, the first network resource, the scheduled time interval, a node sequence of the path, a status of the temporal LSP, or combinations thereof, and/or further comprising receiving, via a receiver of the NE, a deletion request to delete the temporal LSP from the network, sending, via the transmitter, a LSP deletion request to the node requesting deletion of the temporal LSP from the network, receiving, via the receiver, a LSP deletion response from the node indicating a deletion status of the temporal LSP, releasing, via the processor, the first network resource reserved on the link for the temporal LSP, releasing, via the processor, the global ID allocated for identifying the temporal LSP, and deleting, from the memory, the path information associated with the temporal LSP, and/or wherein the LSP creation request is sent via an interior gateway protocol (IGP), wherein the node is an egress node of the temporal LSP, and wherein the method further comprises receiving a LSP creation response from an ingress node of the temporal LSP indicating a creation status of the temporal LSP, and/or wherein the LSP creation request is sent via a path computation element (PCE) communication protocol (PCEP), wherein the LSP creation request is a PCEP path computation LSP initiate request (PCInitiate) message, wherein the node is a path computation client (PCC) associated with the temporal LSP, and wherein the method further comprises receiving a PCEP LSP state report (PCRpt) message from the PCC indicating a creation status of the temporal LSP, and/or wherein the network operates under a local domain, wherein the temporal LSP crosses the local domain and a remote domain, wherein the path is a first path portion of an end-to-end path of the temporal LSP, and wherein the method further comprises sending, via the transmitter, a path computation request to a remote network controller that controls the remote domain requesting computation of a second path portion in the remote domain that satisfies the constraint in the scheduled time interval for the end-to-end path of the temporal LSP, receiving, via a receiver of the NE, a path computation reply from the remote network controller indicating the second path portion, sending, via the transmitter, a resource reservation request to the remote network controller requesting reservation of a second network resource in the remote domain for the temporal LSP in the scheduled time interval, and receiving, via the receiver, a resource reservation reply from the remote network controller indicating a resource reservation status.

In another embodiment, the disclosure includes a network controller comprising a processor configured to compute a path in a network for a temporal LSP, wherein the path satisfies a constraint in a scheduled time interval comprising a predetermined start time and a predetermined end time, and reserve, at a current time prior to the predetermined start time, a first network resource on a link along the path computed for the temporal LSP, wherein the first network resource is reserved for the temporal LSP to carry traffic in the scheduled time interval, and a transmitter coupled to the processor and configured to send, at the predetermined start time, a LSP creation request to a node associated with the temporal LSP to request creation of the temporal LSP along the path in the network, and send, at the predetermined end time, a LSP deletion request to the node to request deletion of the temporal LSP from the network. In some embodiments, the disclosure also includes a memory coupled to the processor and configured to store a time-based traffic engineering database (TEDB) comprising resource information associated with the link by first time intervals, wherein the first network resource is reserved from the time-based TEDB, and/or wherein the memory is further configured to store a time-based LSP database (LSPDB), and wherein the processor is further configured to allocate a global ID from the time-based LSPDB for identifying the temporal LSP in the network, and store path information associated with the temporal LSP in the time-based LSPDB, wherein the path information indicates the global ID, the first network resource, the scheduled time interval, a node sequence of the path, a status of the temporal LSP, or combinations thereof, and/or further comprising a receiver coupled to the processor and configured to receive a deletion request to delete the temporal LSP from the network, wherein the transmitter is further configured to send a LSP deletion request to the node requesting deletion of the temporal LSP from the network in response to the deletion request, and wherein the processor is further configured to release the first network resource reserved on the link for the temporal LSP to the time-based TEDB, release the global ID allocated for identifying the temporal LSP to the time-based LSPDB, and deleting the path information associated with the temporal LSP from the time-based LSPDB, and/or wherein the network operates under a local domain, wherein the temporal LSP crosses the local domain and a remote domain, wherein the path comprises a first path portion of an end-to-end path of the temporal LSP, wherein the transmitter is further configured to send a path computation request to a remote network controller associated with the remote domain requesting computation of a second path portion in the remote domain that satisfies the constraint in the scheduled time interval for the end-to-end path of the temporal LSP, and sending a resource reservation request to the remote network controller requesting reservation of a second network resource in the remote domain for the temporal LSP in the scheduled time interval, and wherein the network controller further comprises a receiver coupled to the processor and configured to receive a path computation reply from the remote network controller indicating the second path portion in response to the path computation request, and receive a resource reservation reply from the remote network controller indicating a resource reservation status in response to the resource reservation request.

In yet another embodiment, the disclosure includes a method comprising receiving, by a temporal label switched path (T-LSP) manager of a network controller, a request for creating a temporal LSP in a scheduled time interval, computing, by a temporal path computation element (T-PCE) of the network controller, a shortest path in a network satisfying a constraint for the LSP in the scheduled time interval, reserving, in a temporal traffic engineering database (T-TED) of the network controller, resources on each link the LSP traverses for the scheduled time interval, and initiating, at a beginning of the scheduled time interval by the T-LSP manager, setup of the LSP in the network through sending a LSP creation request to a PCC on an ingress node of the LSP. In some embodiments, the disclosure also includes sending, by the T-PCE, a PCEP open message indicating that the T-PCE is capable of supporting temporal LSP path computation, temporal LSP initiation, and temporal LSP maintenance, and/or wherein the temporal LSP crosses multiple domains in the network, wherein the method further comprises communicating, by the T-PCE, with a remote T-PCE to get an end-to-end path for the LSP crossing the multiple domains via a PCEP path computation request (PCReq) message, and wherein the PCReq message comprises a request parameter (RP) object comprising an operation on time interval (OT) field indicating whether the PCReq message is a first request for path computation in the scheduled time interval, a second request for bandwidth reservation for the scheduled time interval, or a third request for bandwidth release for the scheduled time interval, and a N-bit field indicating whether the temporal LSP is a point-to-point (P2P) LSP or a point-to-multipoint (P2MP) LSP, and/or wherein the scheduled time interval is a time period from a first time, denoted as Ta, to a second time, denoted as Tb, wherein the PCReq message further comprises a time-interval object comprising a start-Time field indicating the first time that the LSP starts to carry traffic, and an end-Time field indicating the second time that the LSP ends carrying the traffic, and wherein the first time and the second time are clock times that are synchronized among all NEs in the network, and/or wherein the scheduled time interval is a time period from a first time, denoted as Ta, to a second time, denoted as Tb, and wherein the PCReq message further comprises a time-interval object comprising a start-time-length field indicating a start-time length in seconds from a current local clock time to the time Ta that the LSP starts to carry traffic, wherein the start-time length is Ta minus the current local clock time, and an end-time-length field indicating an end-time length in seconds from the current local clock time to the time Tb that the LSP ends carrying the traffic, wherein the end-time length is Tb minus the current local clock time, and/or wherein the scheduled time interval is a recurrent time interval that the LSP carries traffic, and wherein the PCReq message further comprises a time interval object comprising a number-repeats field indicating a number of repeats, a repeat-time-length field indicating a repeat-time length in seconds of a repeat cycle for the recurrent time interval, and an options field indicating whether the recurrent time interval repeats every day, every week, every month, every year, or repeats every repeat-time length.

For the purpose of clarity, any one of the foregoing embodiments may be combined with any one or more of the other foregoing embodiments to create a new embodiment within the scope of the present disclosure These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Figure 1:
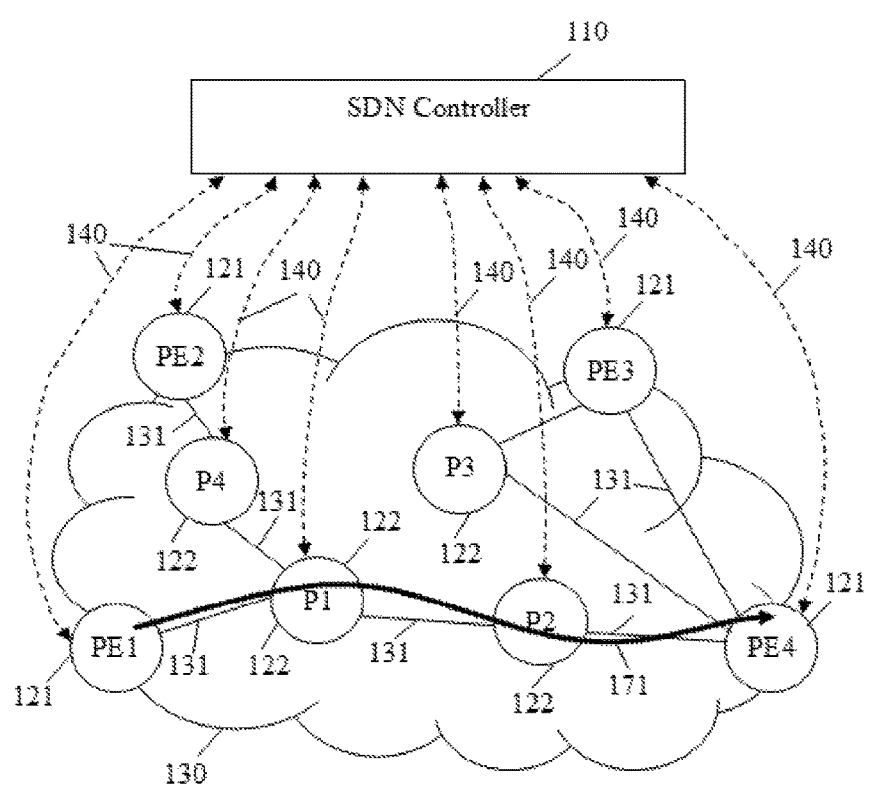
FIG. 1 is a schematic diagram of a SDN system.

FIG. 1 is a schematic diagram of a software-defined network (SDN) system 100. The SDN system 100 comprises an SDN controller 110 and a network 130. The network 130 comprises a plurality of edge nodes 121, shown as PE1, PE2, PE3, and PE4, and a plurality of internal nodes 122, shown as P1, P2, P3, and P4, with some or all nodes interconnected by a plurality of links 131. The edge nodes 121 are located at an edge or a boundary of the network 130. The internal nodes 122 are located within an area of the network 130. The underlying infrastructure of the network 130 may be any types of networks such as an electrical network, an optical network, or combinations thereof. The links 131 may comprise physical links such as fiber optic links, electrical links, wireless links and/or logical links used to transport data in the network 130. The network 130 operates under a single network administrative domain. The network 130 may employ any forwarding data plane such as a multiprotocol label switching (MPLS) forwarding data plane. The SDN controller 110 is communicatively coupled to all edge nodes 121 and all internal nodes 122 of the network 130. The system 100 decouples network control and network forwarding functions.

The SDN controller 110 may be a virtual machine (VM), a hypervisor, or any other device configured to manage and control the network 130. The SDN controller 110 obtains and/or maintains a full topology view of the network 130. The SDN controller 110 computes forwarding paths through the network 130 according to the topology information. For example, the SDN controller 110 may employ a shortest path algorithm to determine a path between a source-destination pair in the network 130. After computing the paths, the SDN controller 110 sends forwarding instructions to the edge nodes 121 and to the internal nodes 122 to instruct the edge nodes 121 and the internal nodes 122 to forward packets according to the computed forwarding paths. The forwarding instructions may be dependent on the routing protocol. The SDN controller 110 communicates with all edge nodes 121 and all internal nodes 122 via a plurality of communication channels 140. The communication channels 140 are also referred to as controller-network communication channels. In an embodiment, the communication channels 140 are OpenFlow channels as described in the OpenFlow switch specification version 1.5.1 defined by Open Networking Foundation (ONF), Mar. 26, 2015.

The edge nodes 121 and the internal nodes 122 are software programmable network devices configured to perform forwarding functions in the network 130 according to forwarding instructions received from the SDN controller 110 via the communication channels 140. The edge nodes 121 are further configured to function as access points or interconnection points between the network 130 and other networks, which may be similar to the network 130 or different from the network 130 and may operate in other domains. For example, the edge nodes 121 may establish networking sessions and/or services with different networks, but may not exchange topology information across the different networks.

In an embodiment, the network 130 may employ MPLS for data forwarding. In MPLS, data packets are assigned labels, which are referred to as path labels or segment labels, and the data packets are forwarded or directed on a LSP based on the labels. In such an embodiment, to establish a LSP between a source and a destination, the SDN controller 110 computes a shortest path through the network 130 for the LSP and reserves network resources such as bandwidths on the links 131 along the computed path of the LSP. The network resources are reserved for the LSP forever or until the LSP is deleted. The SDN controller assigns path labels for the LSP and configures each edge node 121 and each internal node 122 along the path of the LSP. As an example, a LSP 171 traversing the edge node PE1 121, the internal nodes P1 and P2 122, and the edge node PE4 121 is established in the network 130. For example, the edge node PE1 121 is connected to the source and the edge node PE4 121 is connected to the destination. Thus, the edge node PE1 121 is referred to as an ingress node of the LSP 171, the edge node PE4 121 is referred to as an egress node of the LSP 171, and the internal nodes P1 and P2 122 are referred to as transit nodes of the LSP 171. Since the SDN controller 110 manages all network and label resources, the network 130 is not required to employ any Resource Reservation Protocol (RSVP) or label distribution protocol (LDP).

In a large-size SDN network, the management of all resources in the network may be complex and the number of communication channels 140 may be large. Thus, the design and implementation of the SDN controller 110 may be complex and costly. In addition, all edge nodes 121 and all internal nodes 122 in the network 130 are required to be upgraded to SDN-enabled nodes. For example, hardware-based network devices are required to be replaced with programmable or software programmable network devices. Thus, the deployment of the system 100 may be time consuming and costly.

Figure 2:
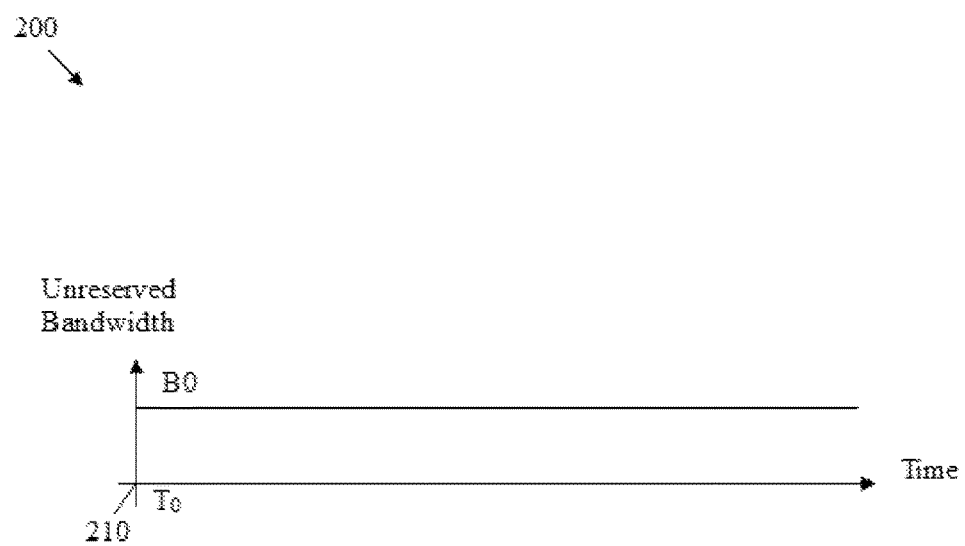
FIG. 2 is a timing diagram of a time-agnostic link bandwidth profile.

FIG. 2 is a timing diagram of a time-agnostic bandwidth reservation profile 200. As used herein, time-agnostic means without any knowledge of, or reference to, time. The x-axis represents time in some arbitrary constant units. The y-axis represents unreserved bandwidth in some arbitrary constant units. The profile 200 represents the bandwidth reserved on a link 131 along the LSP 171. For example, the LSP 171 is created at a current time 210, denoted as $T_0$, and a bandwidth B0 is reserved on the link 131 for the LSP 171. As shown, the bandwidth B0 is reserved from the current time 210 to an indefinite end time or until the LSP 171 is deleted. However, the LSP 171 may only carry traffic over some periods of time. Thus, the reserved bandwidth at the other time are idle or not being utilized. Therefore, the network resources in the system 100 may not be utilized efficiently.

Disclosed herein are various embodiments for creating a temporal LSP in a SDN network in one or more predetermined time intervals. The temporal LSP is scheduled to carry traffic in the predetermined time intervals. The disclosed embodiments employ a TTS controller to compute paths and reserve network resources by time intervals and allowing network nodes to establish temporal LSPs without awareness of the time intervals. Thus, the disclosed embodiments enable the deployment of temporal LSP tunnels with minimal impact to existing networks. The TTS controller may initiate creation and deletion of temporal LSPs by extending the interior gateway protocol (IGP) or the PCEP. The TTS controller communicates with one or more nodes in the network depending on the network communication protocol in use, but not all nodes as in the SDN system 100. In addition, the TTS controller may coordinate with other TTS controllers to create and/or delete temporal LSP that crosses multiple domains. Using LSPs for a predetermined time interval may increase network efficiency and scalability, reduce costs of operation and maintenance of networks, and provide new functions such as LSP tunnel service for a predetermined time interval and LSP tunnel service scheduling.

Figure 3:
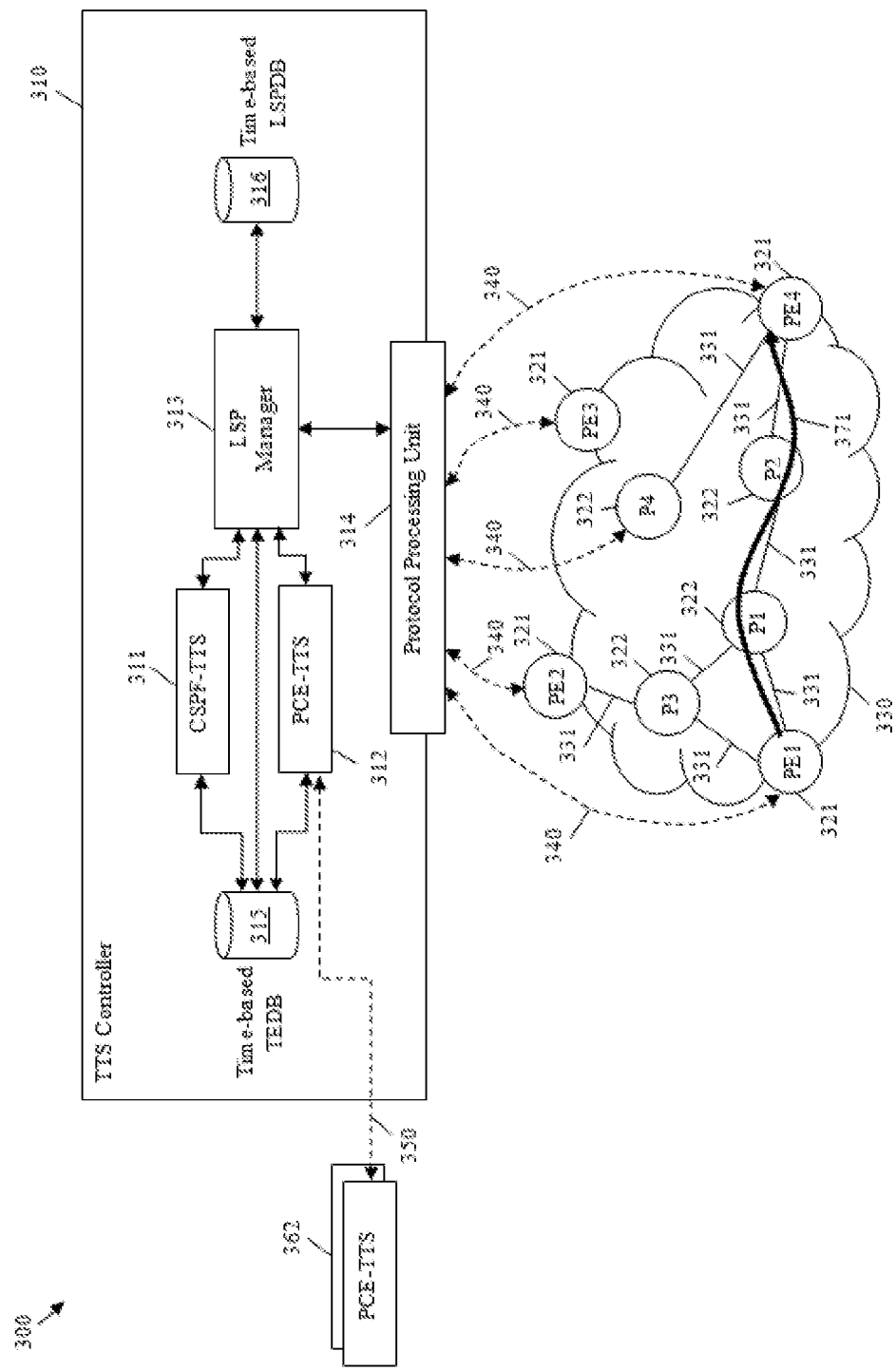
FIG. 3 is a schematic diagram of a TTS system that implements temporal LSPs according to an embodiment of the disclosure.

FIG. 3 is a schematic diagram of a TTS system 300 that implements temporal LSPs according to an embodiment of the disclosure. The system 300 comprises a similar architecture as the hybrid model described in the Internet Engineering Task Force (IETF) draft document draft-chen-teas-frmwk-tts-01.txt, Mar. 21, 2016, which is incorporated herein by reference. The system 300 comprises a TTS controller 310 communicatively coupled to a network 330. The network 330 comprises a plurality of edge nodes 321 shown as PE1, PE2, PE3, and PE4 and a plurality of internal nodes 322 shown as P1, P2, P3, and P4, some of which may be interconnected by a plurality of links 331. The network 330 operates under a single domain. The edge nodes 321 and the internal nodes 322 are similar to the edge nodes 121 and the internal nodes 122, respectively. The links 331 are similar to the links 131.

The TTS controller 310 may be a VM, a hypervisor, a computer server machine, or any other device configured to creation and deletion of temporal LSPs in the network 330 in predetermined or scheduled time intervals. The TTS controller 310 manages and guarantees network resources such as link bandwidths for the temporal LSPs in the predetermined or scheduled time intervals. The TTS controller 310 communicates with the edge nodes 321 and the internal nodes 322 to initiate the creation and deletion of temporal LSPs in the network 330 via one or more communication channels 340 similar to the communication channels 140. It should be noted that the TTS controller 310 may communicate with one or more of the edge nodes 321 and the internal nodes 322, but not all edge nodes 321 and all internal nodes 322. An edge node 321 or an internal node 322 that is in communication with the TTS controller 310 is referred as a communication node.

The TTS controller 310 comprises a constrained shortest path first for temporal tunnel service (CSPF-TTS) unit 311, a PCE-TTS unit 312, a LSP manager 313, a protocol processing unit 314, a time-based TEDB 315, and a time-based LSPDB 316. The CSPF-TTS unit 311 is coupled to the time-based TEDB 315. The PCE-TTS unit 312 is coupled to the time-based TEDB 315 and other PCE-TTS units 362 of other domains. The LSP manager 313 is coupled to the CSPF-TTS unit 311, the PCE-TTS unit 312, the protocol processing unit 314, the time-based TEDB 315, and the time-based LSPDB 316. Time-based refers to the management, maintenance, storage, and/or representation of information by time intervals. In an embodiment, the CSPF-TTS unit 311 is referred to as a temporal CSPF (T-CSPF), the PCE-TTS units 312 and 362 are referred to as T-PCEs, the LSP manager 313 is referred to as a T-LSP manager, the time-based TEDB 315 is referred to as a T-TED, and the time-based LSPDB 316 is referred to as a temporal LSPDB (T-LSPDB).

The time-based TEDB 315 is configured to store traffic engineering (TE) information of the network 330 by time intervals. For example, the time-based TEDB 315 indicates unreserved network resources in a plurality of time intervals. Some examples of network resource information may include bandwidths, delays, data rates, link types, quality of service (QoS), statuses, and/or any other information associated with the links 331.

The CSPF-TTS unit 311 is configured to compute routing paths for temporal LSPs in the network 330 satisfying certain constraints in predetermined time intervals. The CSPF-TTS unit 311 may employ a constrained shortest path first (CSPF) algorithm and consult with the time-based TEDB 315 to compute the routing paths.

The PCE-TTS unit 312 is configured to coordinate with the CSPF-TTS unit 311 and the other PCE-TTS units 362 to compute routing paths for temporal LSPs crossing multiple domains in predetermined time intervals. The PCE-TTS units 362 are similar to the PCE-TTS unit 312. The PCE-TTS unit 312 communicates with the PCE-TTS units 362 via communication channels 350, which may implement the PCEP with extensions or any suitable network communication protocol.

Although the CSPF-TTS unit 311 is illustrated as a separate component from the PCE-TTS unit 312, the CSPF-TTS unit 311 may be integrated as an internal component of the PCE-TTS unit 312. In addition, in some embodiments, the PCE-TTS unit 312 may be located external to the TTS controller 310. It should be noted that the CSPF-TTS unit 311, the time-based TEDB 315, and the PCE-TTS unit 312 may have access or knowledge of topology information within the domain of the network 330, but not other domains.

The time-based LSPDB 316 is configured to store global IDs for identifying temporal LSPs in the network 330 and path information associated with temporal LSPs in the network 330. The time-based LSPDB 316 stores and tracks availabilities of global IDs. The path information may include a global ID, a node sequences, time intervals, constraints, and states of each temporal LSP in the network 330. As an example, the node sequence may be in the form of {PE4←P2←P1←PE1} to indicate that the temporal LSP 371 traverses from the edge node PE1 321, followed by the internal nodes P1 and P2 322, and to the edge node PE4 321. When an end-to-end path of a temporal LSP crosses multiple domains, the time-based LSPDB 316 stores a global ID and path information of the portion of the end-to-end path that is within the network 330.

The protocol processing unit 314 is configured to communicate with one or more edge nodes 321 and/or internal nodes 322 via one or more communication channels 340 as requested by the LSP manager 313 by extending the IGP, the border gateway protocol (BGP), the PCEP, the OpenFlow protocol, or any suitable network communication protocol. When employing the IGP, the protocol processing unit 314 establishes a communication channel with at least one node, which may be an edge node 321 or an internal node 322. For example, the protocol processing unit 314 establishes a communication channel 340 with the internal node P4 322. When employing the PCEP, the protocol processing unit 314 establishes communication channels with all edge nodes 321 of the network 330. Since the protocol processing unit 314 is not required to communicate with all edge nodes 321 and all internal nodes 322 in the network 330 as in the system 100, the design and management of resources in the system 300 is less complex and more efficient than the system 100.

The LSP manager 313 is configured to manage and control creation and deletion of temporal LSPs such as the temporal LSP 371 in the network 330. Upon receiving a request to create a temporal LSP such as the temporal LSP 371 in a number of time intervals, the LSP manager 313 coordinates with the CSPF-TTS unit 311 and/or the PCE-TTS unit 312 to obtain a path satisfying the constraints of the temporal LSP in the time intervals. The LSP manager 313 reserves a bandwidth on each link 331 traversed by the temporal LSP from the time-based TEDB 315. The LSP manager 313 allocates a global ID from the time-based LSPDB 316 for identifying the temporal LSP and stores information of the temporal LSP in the time-based LSPDB 316. The LSP manager 313 coordinates with the protocol processing unit 314 to initiate creation of the temporal LSP in the network at the beginning of each time interval. After creating the temporal LSP, the LSP manager 313 updates the status of the temporal LSP and notifies the user or application that the temporal LSP is established. At the end of each time interval, the LSP manager 313 coordinates with the protocol processing unit 314 to initiate deletion of the temporal LSP.

Upon receiving a request to delete the temporal LSP or at the end of the last time interval, the LSP manager 313 releases the reserved bandwidth to the time-based TEDB 315. The LSP manager 313 releases the reserved or allocated global ID to the time-based LSPDB 316 and removes information about the temporal LSP from the time-based LSPDB 316. The LSP manager 313 coordinates with the protocol processing unit 314 to initiate deletion of the temporal LSP in the network. The LSP manager 313 updates the status of the temporal LSP and notifies the user or application that the temporal LSP is deleted.

In an embodiment, when the system 300 employs the IGP, the protocol processing unit 314 sends LSP creation requests and LSP deletion requests to an edge node 321 or an internal node 322 that is closest to an egress node of the temporal LSP and in communication with the protocol processing unit 314 as described in the U.S. patent application Ser. No. 14/737,142 filed on Jun. 11, 2015 by Huaimo Chen, et al., and titled "Zone Routing System," which is incorporated by reference. In such an embodiment, the edge nodes 321 and the internal nodes 322 are not required to run RSVP-traffic engineering (RSVP-TE) or maintain soft states of the temporal LSP. The edge nodes 321 and the internal nodes 322 along the path of the temporal LSP are not aware of any time interval. The edge nodes 321 and the internal nodes 322 along the path of the temporal LSP exchange IGP messages to set up or tear down temporal LSPs without considering any time interval, as described more fully below.

In another embodiment, when the system 300 employs the PCEP, the protocol processing unit 314 sends LSP creation requests and LSP deletion requests to an ingress node, which corresponds to an edge node 321, of the temporal LSP. In such an embodiment, the edge nodes 321 and the internal nodes 322 along the path of the temporal LSP employ RSVP-TE to reserve bandwidths on the links 331 traversed by the temporal LSP, but are not aware of any time interval. Since bandwidth is guaranteed by the TTS controller 310, RSVP-TE bandwidth reservations on the edge nodes 321 and the internal nodes 322 are always successful during the establishment of the temporal LSP. Thus, temporal LSPs may be set up or torn down in the network 330 without modifying the PCEP or the RSVP-TE. Therefore, the network 330 may be deployed to provide temporal LSPs with minimal impact. Although FIG. 3 describes the creation and deletion of P2P temporal LSPs in a single domain, the LSP manager 313 may employ similar mechanisms to create and delete P2MP LSPs and multi-domain temporal LSPs, as described more fully below.

Figure 4:
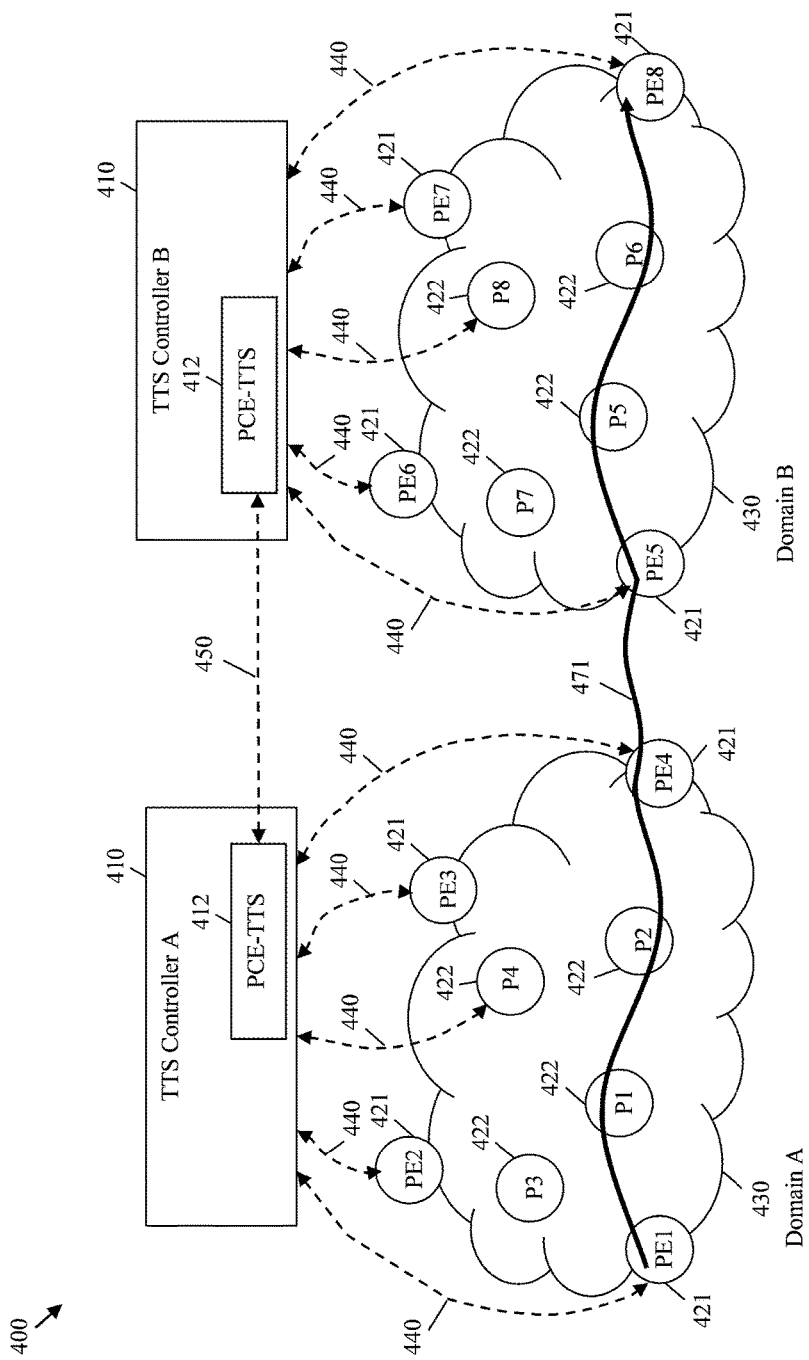
FIG. 4 is a schematic diagram of a TTS system that implements temporal LSPs according to another embodiment of the disclosure.

FIG. 4 is a schematic diagram of a TTS system 400 that implements temporal LSPs according to another embodiment of the disclosure. The TTS system 400 is similar to the system 300 and illustrates a temporal LSP 471 tunneling through multiple domains. The system 400 comprises a plurality of TTS controllers 410, each communicatively coupled to a domain 430 via one or more communication channels 440 similar to the channels 340. The TTS controllers 410 are shown as TTS controller A and TTS controller B. The domains 430 are shown as domain A and domain B. In one embodiment, each domain 430 corresponds to a network 330. In another embodiment, each domain 430 operates a different portion of a network 330. Each domain 430 comprises a plurality of edge nodes 421 and a plurality of internal nodes 422 interconnected by links (not shown) similar to the links 131 and 331. The edge nodes 421 are similar to the edge nodes 121 and 321. The internal nodes 422 are similar to the internal nodes 122 and 322. In the domain A 430, the edge nodes 421 are shown as PE1, PE2, PE3, and PE4 and the internal nodes 422 are shown as P1, P2, P3, and P4. In the domain B 430, the edge nodes 421 are shown as PE5, PE6, PE7, and PE8 and the internal nodes 422 are shown as P5, P6, P7, and P8. The domains 430 are interconnected by links (not shown) similar to the links 131 and 331. For example, the domains A and B 430 are connected via a link between the edge node PE4 421 of the domain A 430 and the edge node PE5 421 of the domain B 430.

The TTS controllers 410 are similar to the TTS controller 310. As shown, each TTS controller 410 comprises a PCE-TTS unit 412 similar to the PCE-TTS units 312 and 362 and may comprise other components such as the CSPF-TTS unit 311, the LSP manager 313, the time-based TEDB 315, and the time-based LSPDB 316 (not shown). The TTS controllers 410 communicate with each other via a communication channel 450 similar to the communication channel 350 between the PCE-TTS units 312 and 362 for computing an end-to-end path for a temporal LSP crossing multiple domains and reserving network resources along the path. Each TTS controller 410 computes shortest paths and reserves bandwidths for temporal LSPs within a domain 430 controlled by the TTS controller 410 using similar mechanisms as described in the system 300 and as described more fully below. Similar to the system 300, the system 400 may employ the IGP, the BGP, the PCEP, the OpenFlow®, or any other network communication protocol to create and delete temporal LSPs across the domains 430, as described more fully below. As an example, the temporal LSP 471 tunnels across the domain A 430 and the domain B 430. For example, the TTS controller A 410 computes a shortest path for the temporal LSP 471 in the domain A 430 in a number of time intervals and reserves bandwidth on links along the shortest path of the temporal LSP in the domain A 430. Similarly, the TTS controller B 410 computes a shortest path for the temporal LSP 471 in the domain B 430 in a number of time intervals and reserves bandwidth on the links along the shortest path of the temporal LSP 471 in the domain B 430.

Figure 5:
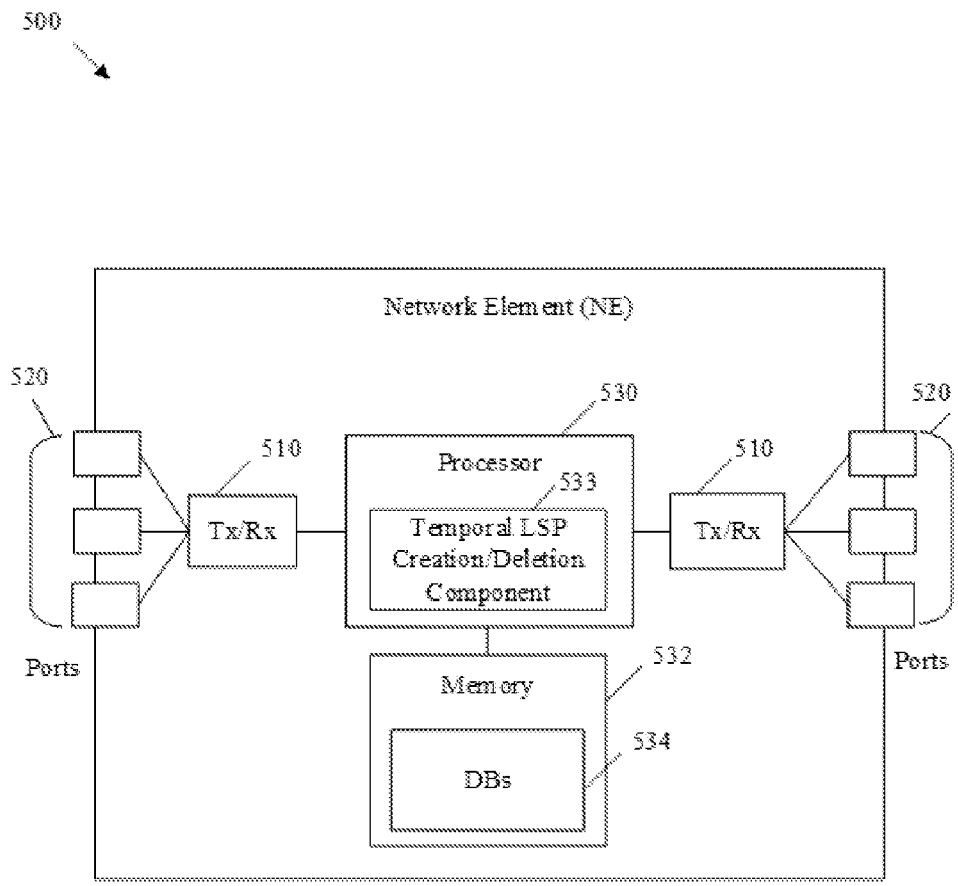
FIG. 5 is a schematic diagram of a NE according to an embodiment of the disclosure.

FIG. 5 is a schematic diagram of a network element (NE) 500 according to an embodiment of the disclosure. For example, NE 500 may act as the network controller 110, the TTS controllers 310 and 410, the edge nodes 121, 321, and 421, the internal nodes 122, 322, and 422, and/or any other network node in the systems 100, 300, or 400. NE 500 may be configured to implement and/or support the temporal LSP creation and deletion mechanisms and schemes described herein. NE 500 may be implemented in a single node or the functionality of NE 500 may be implemented in a plurality of nodes. One skilled in the art will recognize that the term NE encompasses a broad range of devices of which NE 500 is merely an example. NE 500 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 500. For instance, the features/methods in the disclosure may be implemented using hardware, firmware, and/or software installed to run on hardware. The NE 500 is any device that transports packets through a network, e.g., a switch, router, bridge, server, a client, etc. As shown in FIG. 5, the NE 500 comprises transceivers (Tx/Rx) 510, which may be transmitters, receivers, or combinations thereof. The Tx/Rx 510 is coupled to a plurality of ports 520 for transmitting and/or receiving frames from other nodes.

A processor 530 is coupled to each Tx/Rx 510 to process the frames and/or determine which nodes to send the frames to. The processor 530 may comprise one or more multi-core processors and/or memory devices 532, which may function as data stores, buffers, etc. The processor 530 may be implemented as a general processor or may be part of one or more application specific integrated circuits (ASICs) and/or digital signal processors (DSPs). The processor 530 comprises a temporal LSP creation/deletion component 533, which may perform temporal LSP creation and deletion and may implement methods 700, 800, 900, 1000, 1100, 1200, 1300, 1400, 1500, 1600, 1700, or 1800, as discussed more fully below, and/or any other flowcharts, schemes, and methods discussed herein. As such, the inclusion of the temporal LSP creation/deletion component 533 and associated methods and systems provide improvements to the functionality of the NE 500. Further, the temporal LSP creation/deletion component 533 effects a transformation of a particular article (e.g., the network) to a different state. In an alternative embodiment, the temporal LSP creation/deletion component 533 may be implemented as instructions stored in the memory device 532, which may be executed by the processor 530. Further, in the alternative embodiment, the NE 500 may comprise any other means for implementing the methods 700, 800, 900, 1000, 1100, 1200, 1300, 1400, 1500, 1600, 1700, or 1800.

The memory device 532 may comprise a cache for temporarily storing content, e.g., a random-access memory (RAM). Additionally, the memory device 532 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 532 is configured to store databases (DBs) 534 such as the time-based TEDB 315 and the time-based LSPDB 316 depending on the embodiments.

It is understood that by programming and/or loading executable instructions onto the NE 500, at least one of the processor 530 and/or memory device 532 are changed, transforming the NE 500 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 6:
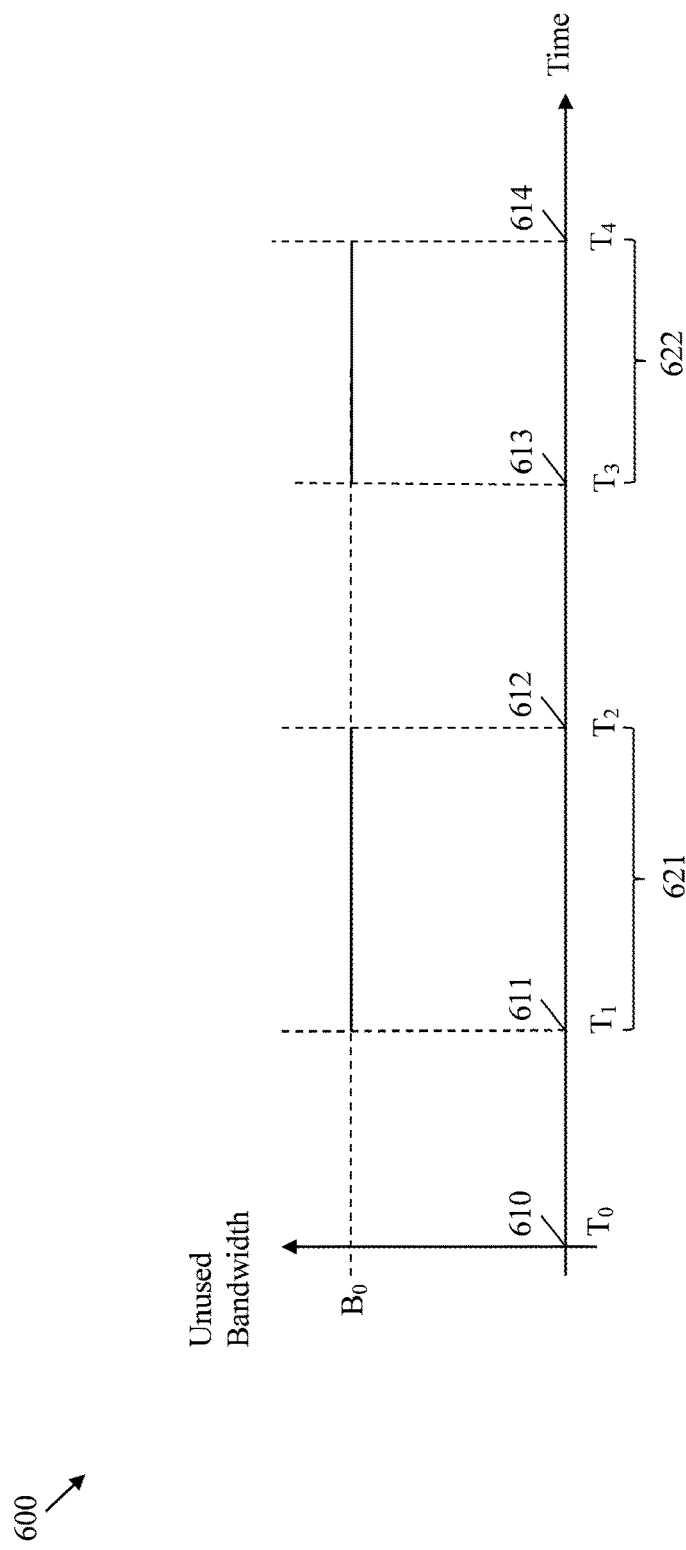
FIG. 6 is a timing diagram of a time-based link bandwidth reservation profile according to an embodiment of the disclosure.

FIG. 6 is a timing diagram of a time-based link bandwidth reservation profile 600 according to an embodiment of the disclosure. The x-axis represents time in some arbitrary constant units. The y-axis represents unreserved bandwidth in some arbitrary constant units. The profile 600 represents the bandwidth reserved on a link such as the links 331 along a temporal LSP such as the temporal LSPs 371 or 471. For example, at a current time 610, denoted as $T_0$, a TTS controller such as the TTS controller 310 or 410 reserves a bandwidth in an amount of $B_0$ for the temporal LSP in a first time interval 621 and a second time interval 622. The first time interval 621 begins at a time 611, denoted as $T_1$, and ends at a time 612, denoted as $T_2$. The second time interval 622 begins at a time 613, denoted as $T_3$, and ends at a time 614, denoted as $T_4$. By reserving bandwidth or any other network resources for temporal LSPs by time intervals instead of indefinitely as shown the in the profile 200, network resources may be utilized efficiently. It should be noted that the time intervals 621 and 622 may be indicated using absolute time, relative time, or combinations thereof. When employing absolute time, $T_0$, $T_1$, $T_2$, $T_3$ and $T_4$ are represented by global clock times in a network such as the systems 300 or 400 synchronized among all nodes such as the edge nodes 121, 321, and 421 and the internal nodes 122, 322, and 422 in the network. When employing relative time, each node may use a local clock time, which may be different from another node in the network. The details of indicating time intervals for temporal LSP creation and deletion are described more fully below.

Figure 7:
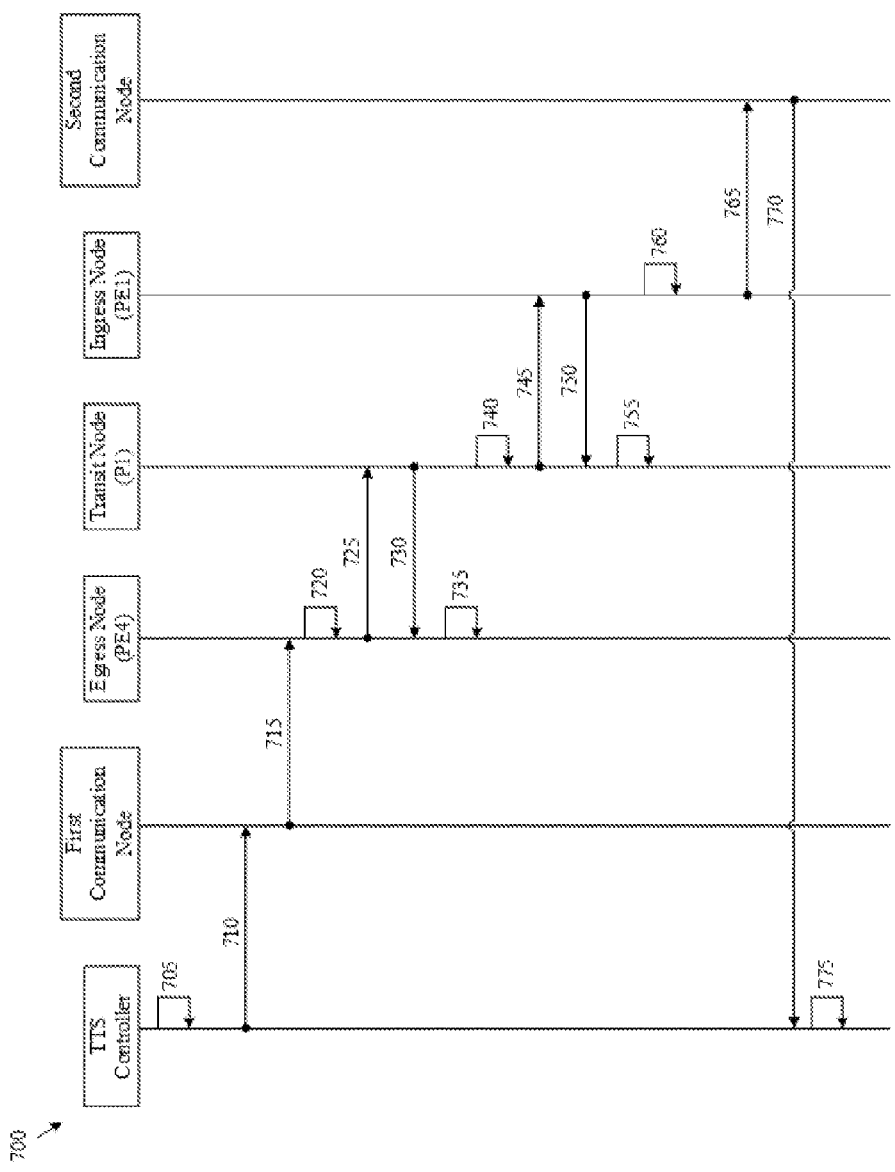
FIG. 7 is a protocol diagram of a method of creating a temporal LSP within a domain via an IGP according to an embodiment of the disclosure.

FIG. 7 is a protocol diagram of a method 700 of creating a temporal LSP such as the temporal LSPs 371 and 471 within a domain similar to the network 330 or the domains 430 via the IGP according to an embodiment of the disclosure. The method 700 is implemented between a TTS controller, a first communication node of the network, an egress node PE4 of a temporal LSP, a transit node P1 of the temporal LSP, an ingress node PE1 of the temporal LSP, and a second communication node of the network, any of which may be implemented as the NE 500. The TTS controller is similar to the TTS controllers 310 or 410. The first and second communication nodes are in direct association or communication with the TTS controller via communication channels similar to the communication channels 340 or 440. The method 700 is implemented when the TTS controller receives a request to create a temporal LSP in a time interval, for example, from a user or an application.

At step 705, the TTS controller computes a shortest path for the temporal LSP satisfying constraints of the temporal LSP in the time interval, for example using a CSPF-TTS such as the CSPF-TTS unit 311. The path traverses from the ingress node PE1 to the egress node PE4 through the transit node P1 (e.g., {PE4←P1←PE1}). After computing the path, the TTS controller reserves bandwidths on links such as the links 131 and 331 along the path of the temporal LSP in the time interval, for example, from a time-based TEDB such as the time-based TEDB 315. After reserving the bandwidths, the TTS controller allocates a global ID (e.g., LSP-ID) for the LSP, for example, from a time-based LSPDB such as the time-based LSPDB 316.

At step 710, at a start time or beginning of the time interval, the TTS controller determines that the first communication node is a next-hop node or a closest node to the egress node PE4 among all communication nodes and sends a first LSP creation request to the first communication node, for example, via a protocol processing unit such as the protocol processing unit 314. For example, the LSP creation request includes the LSP-ID, a node sequence along the path of the LSP, which may be represented by {PE4←P1←PE1}, and a traffic class or source-destination information associated with the temporal LSP.

At step 715, upon receiving the LSP creation request, the first communication node determines that it is not the egress node PE4 and forwards the LSP creation request to the egress node PE4.

At step 720, upon receiving the first LSP creation request, the egress node PE4 allocates a local label (e.g., L4), records the local label under the LSP-ID, and creates a forwarding information base (FIB) entry (e.g., (L4, pop)) to facilitate subsequent packet forwarding along the temporal LSP. The FIB entry may be stored in local memory such as the memory device 532. For example, when the egress node PE4 receives a packet, the egress node PE4 determines a forwarding port according to the FIB. When the received packet is attached with a label L4, the egress node PE4 removes the label L4 and forwards the packet to the destination of the packet.

At step 725, the egress node PE4 sends a second LSP creation request to the transit node P1 (e.g., a next upstream node along the path). The second LSP creation request includes L4, LSP-ID, the traffic class, remaining hops in the path (e.g., {P1←PE1}), the LSP traffic class, and the TTS controller address. The egress node PE4 may store the second LSP creation request in the memory until the transit node P1 acknowledges the receipt of the second LSP creation request.

At step 730, upon receiving the second LSP creation request from the egress node PE4, the transit node P1 sends a first acknowledgement to the egress node PE4 to acknowledge the receipt of the second LSP creation request.

At step 735, upon receiving the first acknowledgement, the egress node PE4 flushes the second LSP creation request from the memory.

At step 740, in response to the second LSP creation request, the transit node P1 allocates a local label (e.g., L1), records label L1 under LSP-ID, and creates an FIB entry (e.g., (L1, L4)) to facilitate subsequent packet forwarding to the egress node PE4. For example, when the transit node P1 receives a packet with a label L1, the transit node P1 removes the label L1, attaches a label L4 to the packet, and forwards the packet to the egress node PE4.

At step 745, the transit node P1 sends a third LSP creation request to the ingress node PE1 (e.g., a next upstream node along the path). The third LSP creation request includes L1, LSP-ID, remaining hops in the path (e.g., {PE1}), the LSP traffic class, and the TTS controller address. Similarly, the transit node P1 may store the third LSP creation request in local memory until the ingress node PE1 acknowledges the receipt of the third LSP creation request.

At step 750, upon receiving the third LSP creation request from the transit node P1, the ingress node PE1 sends a second acknowledgement to the transit node P1 to acknowledge the receipt of the third LSP creation request.

At step 755, upon receiving the second acknowledgement from the ingress node PE1, the transit node P1 flushes the third LSP creation request from the memory.

At step 760, in response to the third LSP creation request, the ingress node PE1 creates an FIB entry (e.g., traffic class, push L1) to facilitate subsequent packet forwarding to the transit node P1. For example, when the ingress node PE1 receives a packet corresponding to the traffic class, the ingress node PE1 pushes or attaches the label L1 to the packet and forwards the packet to the transit node P1.

At step 765, the ingress node PE1 determines that the second communication node is a next-hop node to reach the TTS controller and sends a LSP creation response to the second communication node. The LSP creation response may comprise the global ID and a LSP creation status. The second communication node may be the same as the first communication node or different from the first communication node.

At step 770, the second communication node forwards the LSP creation response to the TTS controller.

At step 775, upon receiving the LSP creation response, the TTS controller updates a status of the temporal LSP and stores path information of the temporal LSP in the time-based LSPDB. In addition, the TTS controller may notify the user or the application of the temporal LSP creation status.

Figure 8:
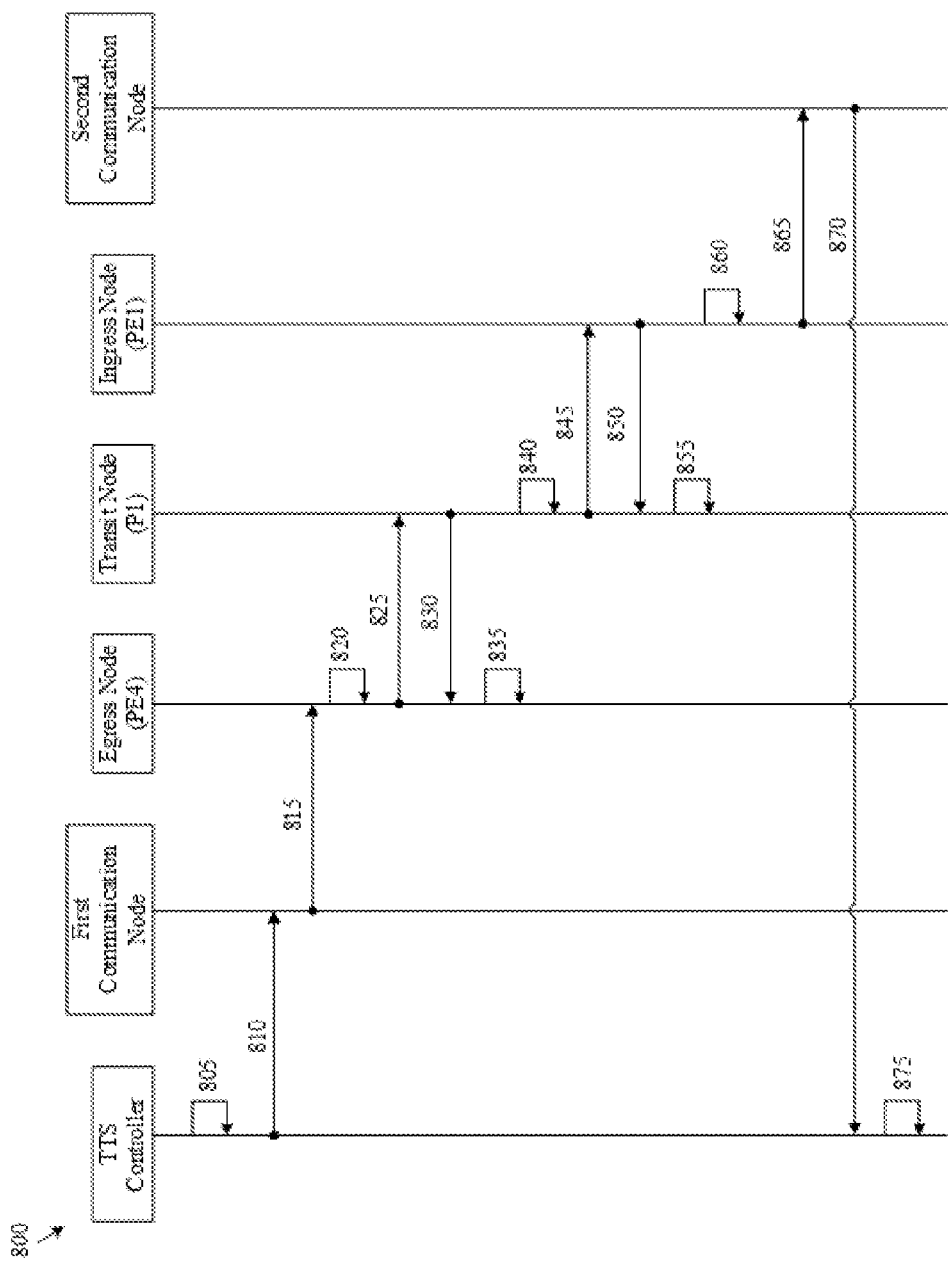
FIG. 8 is a protocol diagram of a method of deleting a temporal LSP within a domain via an IGP according to an embodiment of the disclosure.

FIG. 8 is a protocol diagram of a method 800 of deleting a temporal LSP such as the temporal LSPs 371 or 471 within a domain similar to the network 330 or the domains 430 via an IGP according to an embodiment of the disclosure. The method 800 is implemented between a TTS controller, a first communication node of the network, an egress node PE4 of a LSP, a transit node P1 of the LSP, an ingress node PE1 of the LSP, and a second communication node of the network, any of which may be implemented as the NE 500. The TTS controller is similar to the TTS controllers 310 and 410. The first and second communication nodes are in direct communication or association with the TTS controller via communication channels similar to the communication channels 340. The method 800 is implemented after the TTS controller created a temporal LSP in a time interval by employing the method 700. The method 800 may be implemented when the TTS controller receives a request from a user or an application to delete the temporal LSP or at the end of the time interval scheduled for the temporal LSP. For example, the temporal LSP is identified by a global ID (e.g., LSP-ID) and traverses from the ingress node PE1 to the egress node PE4 through the transit node P1 (e.g., {PE4←P1←PE1}). The egress node PE4 comprises an FIB entry, (L4, pop), for data forwarding along the LSP, where L4 is a local label allocated by the egress node PE4 and recorded under LSP-ID. The transit node P1 comprises an FIB entry, (L1, L4), for data forwarding along the LSP, where L1 is a local label allocated by the transit node P1 and recorded under LSP-ID. The ingress node PE1 comprises an FIB entry, (traffic class, push L1), for data forwarding along the LSP. Each of the egress node PE4, the transit node P1, and the ingress node PE1 may store the FIB entry, the global ID, and/or the local label in local memory such as the memory device 532.

At step 805, the first TTS controller searches for information associated with the temporal LSP from a first time-based LSPDB of the first TTS controller. The information indicates the egress node, the transit nodes, and the ingress node of the temporal LSP.

At step 810, the TTS controller determines that the first communication node is a next-hop node or a closest node to the egress node PE4 among all communication nodes and sends a first LSP deletion request to the first communication node. The first LSP deletion request includes the global LSP-ID, a node sequence, {PE4←P1←PE1}, for the LSP, and the TTS controller address.

At step 815, upon receiving the first LSP deletion request, the first communication node determines that it is not the egress node PE4 and forwards the first LSP deletion request to the egress node PE4.

At step 820, upon receiving the first LSP deletion request, the egress node PE4 releases L4 recorded under LSP-ID and removes the FIB entry, (L4, pop).

At step 825, the egress node PE4 sends a second LSP deletion request to the transit node P1 (e.g., a next upstream node along the LSP) requesting deletion of the LSP. The second LSP deletion request includes L4, LSP-ID, and the remaining hops in the LSP (e.g., {P1←PE1}). The egress node PE4 may store the second LSP deletion request in the local memory until the transit node P1 acknowledges the receipt of the second request.

At step 830, upon receiving the second request from the egress node PE4, the transit node P1 sends a first acknowledgement to the egress node PE4 to acknowledge the receipt of the second LSP deletion request.

At step 835, upon receiving the first acknowledgement from the transit node P1, the egress node PE4 may flush the second LSP deletion request from the local memory.

At step 840, in response to the second LSP deletion request, the transit node P1 releases L1 recorded under LSP-ID and removes the FIB entry, (L1, L4).

At step 845, the transit node P1 sends a third LSP deletion request to the ingress node PE1 (e.g., a next upstream node along the LSP) requesting deletion of the LSP. The third LSP deletion request includes L1, LSP-ID, and the remaining hop in the LSP (e.g., {PE1}). Similarly, the transit node P1 may store the third LSP deletion request in the local memory until the ingress node PE1 acknowledges the receipt of the third LSP deletion request.

At step 850, upon receiving the third LSP deletion request from the transit node P1, the ingress node PE1 sends a second acknowledgement to the transit node P1 to acknowledge the receipt of the third request.

At step 855, upon receiving the second acknowledgement from the ingress node PE1, the transit node P1 may flush the third LSP deletion request from the local memory.

At step 860, in response to the third LSP deletion request, the ingress node PE1 deletes the FIB entry, (traffic, push L1) corresponding to the LSP-ID.

At step 865, the ingress node PE1 determines that the second communication node is a next-hop node to reach the TTS controller and sends a LSP deletion response to the TTS controller. The LSP deletion response includes the LSP-ID and a deletion status of the LSP.

At step 870, the second communication node forwards the LSP deletion response to the TTS controller.

At step 875, upon receiving the response, the TTS controller releases the reserved bandwidths to the time-based TEDB, releases the global ID to the time-based LSPDB, and removes path information of the temporal LSP from the time-based LSPDB. In addition, the TTS controller may notify the user or the application of the temporal LSP deletion status.

Although the methods 700 and 800 are illustrated with a single transit node, the methods 700 and 800 may be employed with any number of transit nodes, which each performs similar operations as the transit node P1. In addition, the methods 700 and 800 may be employed to create and delete a P2MP LSP, respectively. To create or delete a P2MP LSP, the TTS controller sends a LSP creation or deletion request to each egress node (e.g., destination node) of the P2MP LSP.

Further, the methods 700 and 800 may be employed to create and delete temporal LSPs scheduled for a series of scheduled time intervals, respectively. To create a temporal LSP scheduled for a number of time intervals, the path is computed to satisfy the constraints of the temporal LSP in each time interval and the bandwidths are reserved for the temporal LSP in each time interval at step 705. At the beginning of each time interval, the TTS controller sends a LSP creation request to the egress node PE4, which triggers the steps of 710-770. At the end of each time interval, the TTS controller sends a LSP deletion request to the egress node PE4, which triggers the steps of 810-870. The step 875 is performed at the end of the last time interval scheduled for the temporal LSP.

It should be noted that the sending of the acknowledgements at steps 730, 750, 830, and 850 and/or the flushing of the requests at steps 735, 755, 835, and 855 may be optional. In addition, the first communication node and the second communication node may be the same node. Further, the first communication node may be the egress node or the ingress node. Similarly, the second communication node may be the egress node or the ingress node.

The methods 700 and 800 may be applied when the first communication node or the second communication node are connected to the TTS controller via one or more transit nodes. In one embodiment, each transit node along a shortest path between the TTS controller and first communication node functions as a relay node. For example, when a relay node receives a first LSP creation request from a previous-hop node along the shortest path, which may be the TTS controller or another node, the relay node generates a second LSP creation request according to the received first LSP creation requests (e.g., same content). The relay node sends an acknowledgement to the previous-hop node to acknowledge the receipt of the first LSP creation request and sends the second LSP creation request to a next-hop node along the shortest path. In such an embodiment, each relay node flushes a previously sent LSP creation request after receiving a corresponding acknowledgement. Similarly, when the TTS controller receives an acknowledgement for a previously sent LSP creation request, the TTS controller flushes the LSP creation request. In some other embodiments, relay nodes and communication nodes do not flush LSP creation requests after receiving acknowledgements from next-hop nodes. In such embodiments, the TTS controller flushes a previously sent LSP creation request after receiving a corresponding LSP creation response. The relay nodes and the communication nodes flush LSP creation requests after previous-hop nodes flush the LSP creation requests. The relay nodes perform similar operations for LSP creation response, LSP deletion request, and LSP deletion response.

Figure 9:
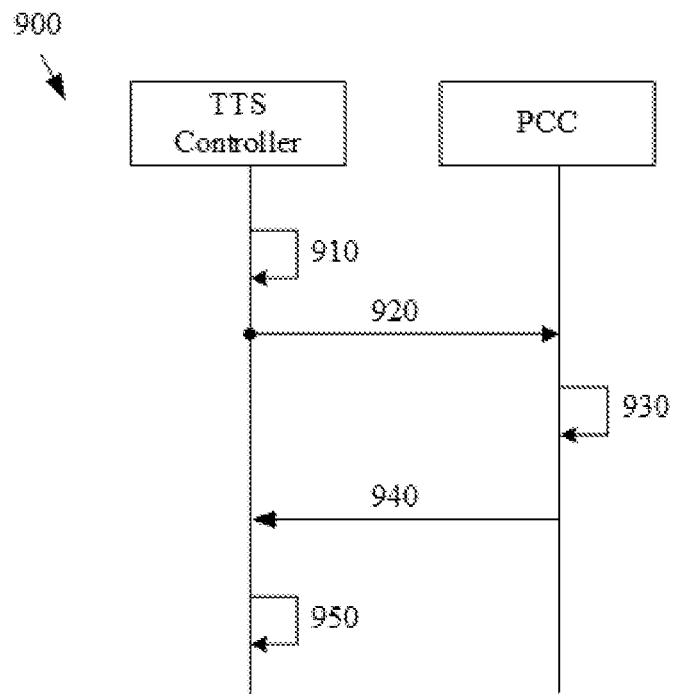
FIG. 9 is a protocol diagram of a method of creating a temporal LSP within a domain via a PCEP according to an embodiment of the disclosure.

FIG. 9 is a protocol diagram of a method 900 of creating a temporal LSP such as the temporal LSPs 371 or 471 within a domain similar to the network 330 or the domains 430 via a PCEP according to an embodiment of the disclosure. The method 900 is implemented between a TTS controller (similar to the TTS controllers 310 or 410) and a path computation client (PCC), any of which may be implemented as the NE 500. The PCC may be implemented on an ingress node of the temporal LSP or a separate NE configured to signal creation or deletion of the temporal LSP along a path of the temporal LSP when instructed by the TTS controller. The TTS controller is similar to the TTS controllers 310 or 410. The method 900 is implemented when the TTS controller receives a request to create a temporal LSP in a time interval, for example, from a user, an application, an ingress node of the temporal LSP, or the PCC, for example.

At step 910, the TTS controller computes a shortest path for the temporal LSP satisfying constraints of the temporal LSP in the time interval, for example using a CSPF-TTS such as the CSPF-TTS unit 311. After computing the path, the TTS controller reserves bandwidths on links such as the links 131 or 331 along the path of the temporal LSP in the time interval, for example, from a time-based TEDB such as the time-based TEDB 315. After reserving the bandwidths, the TTS controller allocates a global ID (e.g., LSP-ID) for the LSP, for example, from a time-based LSPDB such as the time-based LSPDB 316.

At step 920, at the beginning of the time interval, the TTS controller sends a LSP creation request to the PCC to initiate creation of the temporal LSP in the domain. The LSP creation request indicates the computed path (e.g., a node sequence). The LSP creation request may be sent via a PCInitiate message with extensions. The PCInitiate message is described in the IETF draft document ietf-pce-pce-initiated-lsp-05.txt, Oct. 19, 2015.

At step 930, upon receiving the LSP creation request, the PCC triggers RSVP-TE to signal the temporal LSP along the path in the domain. Since the bandwidth is guaranteed by the TTS controller, RSVP-TE bandwidth reservation at each node along the path is successful.

At step 940, when the creation of the temporal LSP in the domain is completed, the PCC sends a LSP creation response to the TTS controller. The LSP creation response may be sent via a LSP state report (PCRpt) message with extensions. The PCRpt message is described in the ietf-pce-pce-initiated-lsp-05.txt.

At step 950, upon receiving the LSP creation response, the TTS controller updates status of the temporal LSP and stores path information of the temporal LSP in the time-based LSPDB. In addition, the TTS controller may notify the user or the application of the temporal LSP creation status.

Figure 10:
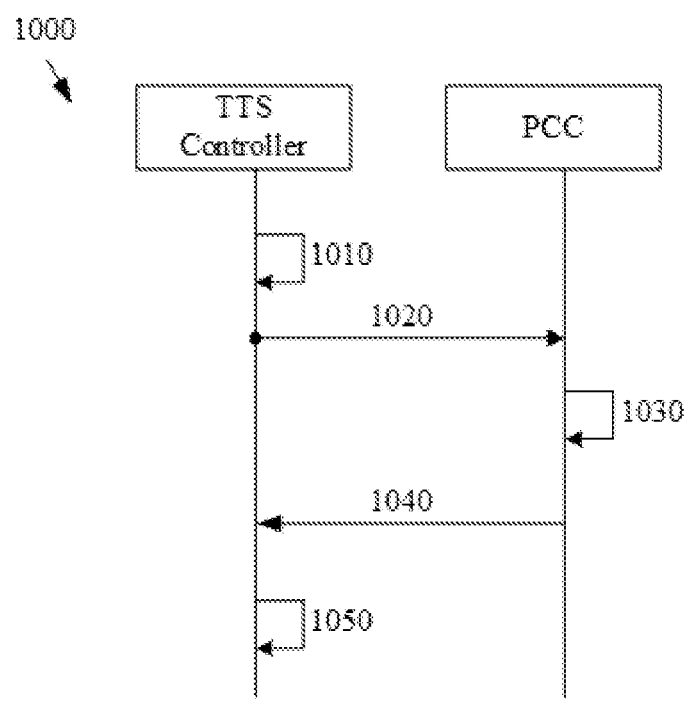
FIG. 10 is a protocol diagram of a method of deleting a temporal LSP within a domain via a PCEP according to an embodiment of the disclosure.

FIG. 10 is a protocol diagram of a method 1000 of deleting a temporal LSP such as the temporal LSPs 371 or 471 within a domain similar to the network 330 or the domains 430 via a PCEP according to an embodiment of the disclosure. The method 1000 is implemented between a TTS controller and PCC of the domain, any of which may be implemented as the NE 500. The TTS controller is similar to the TTS controllers 310 or 410. The method 1000 is implemented after the TTS controller created a temporal LSP in a time interval, such as by employing the method 900. The method 1000 may be implemented when the TTS controller receives a request from a user or an application to delete the temporal LSP or at the end of the time interval scheduled for the temporal LSP. For example, the temporal LSP is identified by a global ID (e.g., LSP-ID).

At step 1010, the TTS controller searches for information associated with the temporal LSP from a time-based LSPDB such as the time-based LSPDB 316 of the TTS controller. The information indicates the egress node, the transit nodes, and the ingress node of the temporal LSP.

At step 1020, the TTS controller sends a LSP deletion request to the PCC to initiate deletion of the temporal LSP in the domain. The LSP deletion request indicates the path information of the temporal LSP.

At step 1030, upon receiving the LSP deletion request, the PCC triggers RSVP-TE to tear down the temporal LSP in the domain. At step 1040, after completing the tear down, the PCC sends a LSP deletion response to the TTS controller. The LSP deletion response may be sent via a PCRpt message to the TTS controller.

At step 1050, upon receiving the LSP deletion response, the TTS controller releases the reserved bandwidths to the time-based TEDB, releases the global ID to the time-based LSPDB, and removes path information of the temporal LSP from the time-based LSPDB. In addition, the TTS controller may notify the user or the application of the temporal LSP deletion status.

Similar to the methods 700 and 800, the methods 900 and 1000 may be employed to create and delete temporal LSPs in a series of time intervals and to create and delete P2MP temporal LSPs.

Figure 11:
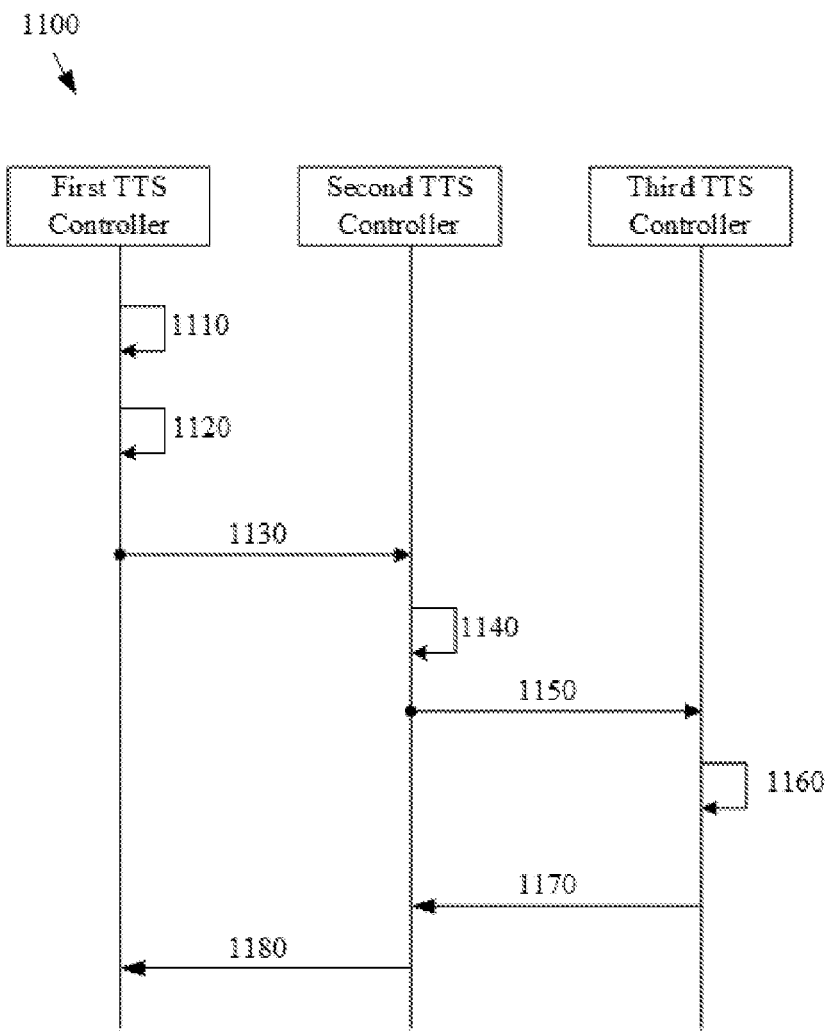
FIG. 11 is a protocol diagram of a method of creating a temporal LSP across multiple domains according to an embodiment of the disclosure.

FIG. 11 is a protocol diagram of a method 1100 of creating a temporal LSP such as the temporal LSPs 471 across multiple domains similar to the network 330 or the domains 430 according to an embodiment of the disclosure. The method 1100 is implemented, for example, between a first TTS controller controlling a first domain, a second TTS controller controlling a second domain, and a third TTS controller controlling a third domain, any of which may be implemented as the NE 500. The first, second, and third network controllers are similar to the TTS controllers 310 or 410. Each of the first, second, and third TTS controllers maintains a time-based TEDB similar to the time-based TEDB 315 and a time-based LSPDB similar to the time-based LSPDB 316. The second domain interconnects the first and third domains. The method 1100 is implemented when the first TTS controller receives a request to create a temporal LSP that tunnels through multiple domains in a time interval, for example, from a user or an application. For example, a source of the temporal LSP is connected to the first domain and a destination of the temporal LSP is connected to the third domain. Thus, the end-to-end path of the temporal LSP comprises a first path portion in the first domain, a second path portion in the second domain, and a third path portion in the third domain.

At step 1110, the first TTS controller computes a shortest path for the temporal LSP satisfying constraints of the temporal LSP in the time interval, for example, using a first PCE-TTS unit of the first TTS controller such as the PCE-TTS units 312 or 412 to coordinate with PCE-TTS units of other domains.

At step 1120, the first TTS controller reserves bandwidths on links such as the links 131 or 331 along the first path portion of the temporal LSP in the time interval from a first time-based TEDB of the first TTS controller. The TTS controller allocates a first global ID (e.g., LSP-ID) for identifying the temporal LSP in the first domain from a first time-based LSPDB of the first TTS controller. The first TTS controller stores information of the path computed into the LSPDB. The first TTS controller may store the path information in the LSDPB using various schemes. In one embodiment, the path comprises a first path portion in the first domain, a first path key for a second path portion in the second domain, and a second path key for a third path portion in the third domain in the LSPDB. In another embodiment, the path comprises the first path portion, the second path portion, and the third path portion.

At step 1130, the first TTS controller sends a first request to the second TTS controller requesting the second TTS controller to reserve bandwidths for the temporal LSP in the time interval, for example, via the first PCE-TTS unit to a second PCE-TTS unit of the second TTS controller. The first TTS controller may send the first request to the second TTS controller along the path of the temporal LSP. The first request includes the first global ID and the first TTS controller address and information associated with the remaining path from the first domain to the destination. The combination of the first global ID and the first TTS controller address uniquely identifies the LSP globally in any TTS controller.

At step 1140, upon receiving the first request, the second TTS controller reserves bandwidths on links along the second path portion of the temporal LSP in the time interval from a second time-based TEDB of the second TTS controller. The second TTS controller allocates a second global ID for the temporal LSP from a second time-based LSPDB of the second TTS controller and stores the first global ID, the first TTS controller address, and bandwidth reservation information into the LSPDB.

At step 1150, the second TTS controller determines that the destination of the temporal LSP is not in the second domain according to the first request and sends a second request to the third TTS controller requesting the third TTS controller to reserve bandwidths for the temporal LSP. Similarly, the second controller may send the second request to the third TTS controller along the path of the temporal LSP. The second request includes the first global ID, the first TTS controller address, and information associated with the remaining path from the second domain to the destination.

At step 1160, upon receiving the second request, the third TTS controller reserves bandwidths on links along the third path portion of the temporal LSP in the time interval from a third time-based TEDB of the third TTS controller. The third TTS controller allocates a global ID for the temporal LSP from a third time-based LSPDB of the third TTS controller and stores the first global ID, the first TTS controller address, and bandwidth reservation information into the LSPDB.

At step 1170, the third TTS controller determines that the destination or the egress node of the temporal LSP is in the third domain and sends a first reply to the second TTS controller indicating a first reservation status of the temporal LSP in the third domain.

At step 1180, upon receiving the first reply, the second TTS controller sends a second reply to the first TTS controller indicating the first reservation status and a second reservation status of the temporal LSP in the second domain. The first request, the second request, the first reply, and the second reply may be sent via PCEP messages such as PCReq and path computation response (PCRep) messages with extensions, as described more fully below. The PCReq and PCRep messages are described in the IETF draft document draft-ietf-pce-stateful-pce-14.txt, Mar. 20, 2016.

Subsequently, when the first, second, and third domains employ the IGP, the third TTS controller may employ similar mechanisms as described in the methods 700 and 800 to initiate creation and deletion of the temporal LSP at the beginning and the end of the time interval, respectively. For example, the third TTS controller sends a first LSP creation request message to the egress node after it receives a request for reserving resources such as bandwidth for a link along the path portion in the third domain or a second LSP creation request message from the first TTS controller. The first LSP creation message comprises the first TTS controller address, the third path portion in the third domain, a first path key for the second path portion in the second domain, and a second path key for the first path portion in the first domain. The second LSP creation message comprises the first TTS controller address, the first path key, and the second path key.

Upon receiving the first LSP creation request message, the egress node initiates the creation of the LSP crossing the multiple domains along the end-to-end path of the LSP. The IGP creates the LSP in the third domain along the third path portion. When creating the LSP in the second domain, the IGP obtains information of the second path portion from the PCE-TTS in the second TTS controller using the first path key and creates the LSP in the second domain along the second path portion. When creating the LSP in the first domain, the IGP obtains information of the first path portion from the PCE-TTS in the first TTS controller using the second path key and creates the LSP in the first domain along the first path portion. The ingress node of the LSP in the first domain sends the first TTS controller a LSP creation response indicating the status of the LSP creation. The first TTS controller updates the status of the LSP in its LSPDB according to the response. Thus, the LSP crossing multiple domains is created.

Alternatively, when the first, second, and third domains employ the PCEP, the first TTS controller may employ similar mechanisms as described in the methods 900 and 1000 to initiate creation and deletion of the temporal LSP at the beginning and the end of the time interval. For example, the first TTS controller sends a PCInitiate message to a PCC on the ingress node. The PCInitiate message comprises the first path portion in the first domain, a first path key for the second path portion in the second domain, and a second path key for the third path portion in the third domain. The PCC triggers the RSVP-TE to signal the LSP crossing the multiple domains along an end-to-end-path of the LSP. The RSVP-TE signals the LSP in the first domain along the first path portion. When signaling the LSP in the second domain, the RSVP-TE obtains information of the second path portion from the PCE-TTS in the second TTS controller using the first path key and signals the LSP in the second domain along the second path portion. When signaling the LSP in the third domain, the RSVP-TE obtains information of the third path portion from the PCE-TTS in the third TTS controller using the second path key and signals the LSP in the third domain along the third path portion. After signaling the LSP in three domains, the PCC sends the first TTS controller a PCRpt message indicating the status of the LSP. The first TTS controller updates the status of the LSP in its LSPDB according to the PCRpt message. Thus the LSP crossing multiple domains is created.

In an alternative embodiment, the first TTS controller sends a request to each of the second and third TTS controllers to request bandwidth reservation in each of the second and third domains instead of sending a request to the next second TTS controller and having each TTS controller trigger a request to a next TTS controller. It should be noted that although the method 1100 is illustrated with three domains, the method 1100 may be employed to create temporal LSPs across any number of domains.

Figure 12:
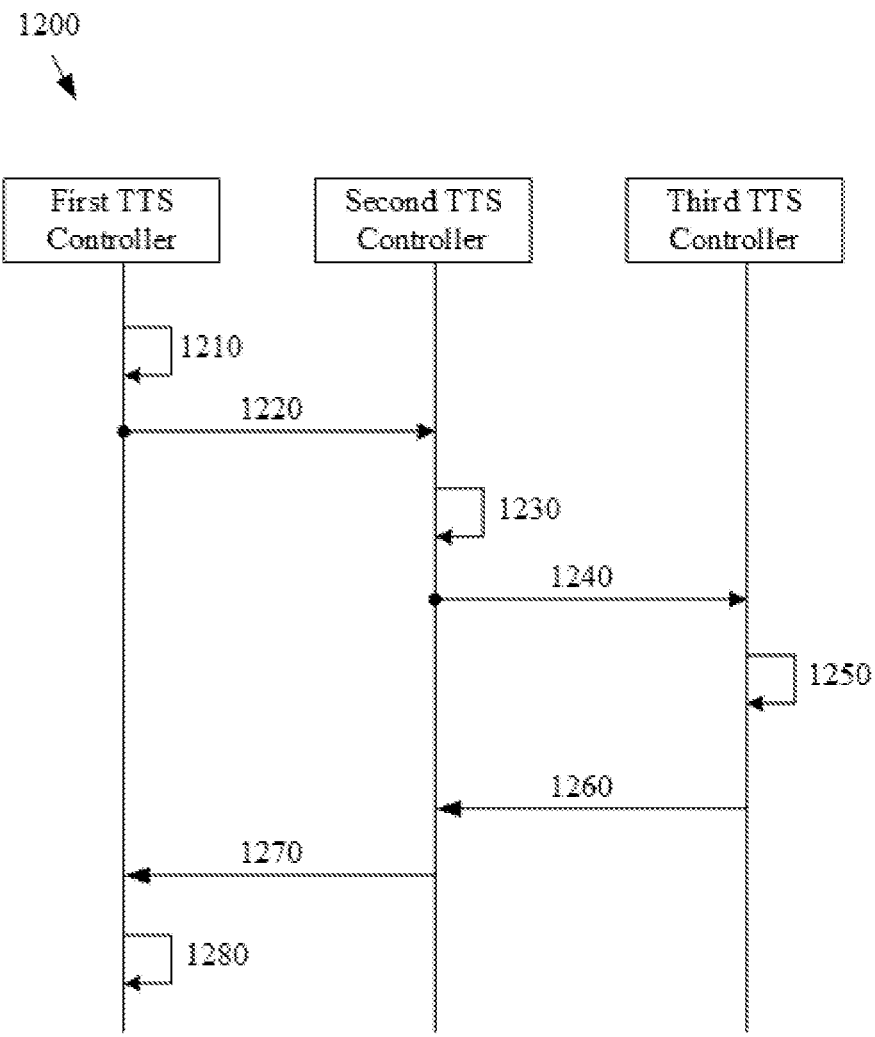
FIG. 12 is a protocol diagram of a method of deleting a temporal LSP that tunnels through multiple domains according to an embodiment of the disclosure.

FIG. 12 is a protocol diagram of a method 1200 of deleting a temporal LSP such as the temporal LSPs 471 that tunnels through multiple domains similar to the network 330 or the domains 430 according to an embodiment of the disclosure. The method 1200 is implemented between a first TTS controller controlling a first domain, a second TTS controller controlling a second domain, and a third TTS controller controlling a third domain, any of which may be implemented as the NE 500. The first, second, and third network controllers are similar to the TTS controllers 310 or 410. Each of the first, second, and third TTS controllers maintains a time-based TEDB similar to the time-based TEDB 315 and a time-based LSPDB similar to the time-based LSPDB 316. The method 1200 is implemented after a temporal LSP tunneling through the first, second, and third domain is created by using the method 1100. For example, an end-to-end path of the temporal LSP comprises a first path portion in the first domain, a second path portion in the second domain, and a third path portion in the third domain. The method 1200 is implemented when the first TTS controller receives a request to delete the temporal LSP, for example, from a user or an application.

At step 1210, the first TTS controller searches for information associated with the temporal LSP from a first time-based LSPDB of the first TTS controller and initiates deletion of the temporal LSP in the first domain, for example, by performing steps 810-870 when employing the IGP or performing steps 1010-1040 when employing a PCEP.

At step 1220, the first TTS controller sends a first request to the second TTS controller requesting the second TTS controller to release the bandwidths reserved for the temporal LSP, for example, via a first PCE-TTS unit such as the PCE-TTS units 312, 362, or 412 of the first TTS controller to a second PCE-TTS unit of the second TTS controller. The first and second PCE-TTS units are similar to the PCE-TTS units 312 or 412. The first TTS controller may send the first request to the second TTS controller along the path of the temporal LSP. The first request includes information associated with the remaining path from the first domain to the destination.

At step 1230, upon receiving the first request, the second TTS controller releases the bandwidths reserved for the temporal LSP to a second time-based TEDB of the second TTS controller.

At step 1240, the second TTS controller determines that the destination of the temporal LSP is not in the second domain according to the first request and sends a second request to the third TTS controller requesting the third TTS controller to release the bandwidths reserved for the temporal LSP. Similarly, the second controller may send the second request to the third TTS controller along the path of the temporal LSP. The second request includes information associated with the remaining path from the second domain to the destination.

At step 1250, upon receiving the second request, the third TTS controller releases the bandwidths reserved for the temporal LSP to a third time-based TEDB of the third TTS controller.

At step 1260, the third TTS controller determines that the destination of the temporal LSP is in the third domain and sends a first reply to the second TTS controller indicating a first bandwidth release status of the temporal LSP in the third domain.

At step 1270, upon receiving the first reply, the second TTS controller sends a second reply to the first TTS controller indicating the first bandwidth release status and a second bandwidth release status of the temporal LSP in the second domain.

At step 1280, upon receiving the second reply, the first TTS controller releases the global ID reserved for the temporal LSP from the first time-based LSPDB and removes information associated with the temporal LSP from the first time-based LSPDB. In addition, the first TTS controller may notify the user or the application of the LSP deletion status. It should be noted that the first request, the second request, the first reply, and the second reply may be sent via PCEP messages with extensions, as described more fully below.

In an alternative embodiment, the first TTS controller sends a request to each of the second and third TTS controllers to request bandwidth release in each of the second and third domains instead of sending a request to the next second TTS controller and having each TTS controller trigger a request to a next TTS controller. It should be noted that although the method 1200 is illustrated with three domains, the method 1200 may be employed to delete temporal LSPs across any number of domains.

Figure 13:
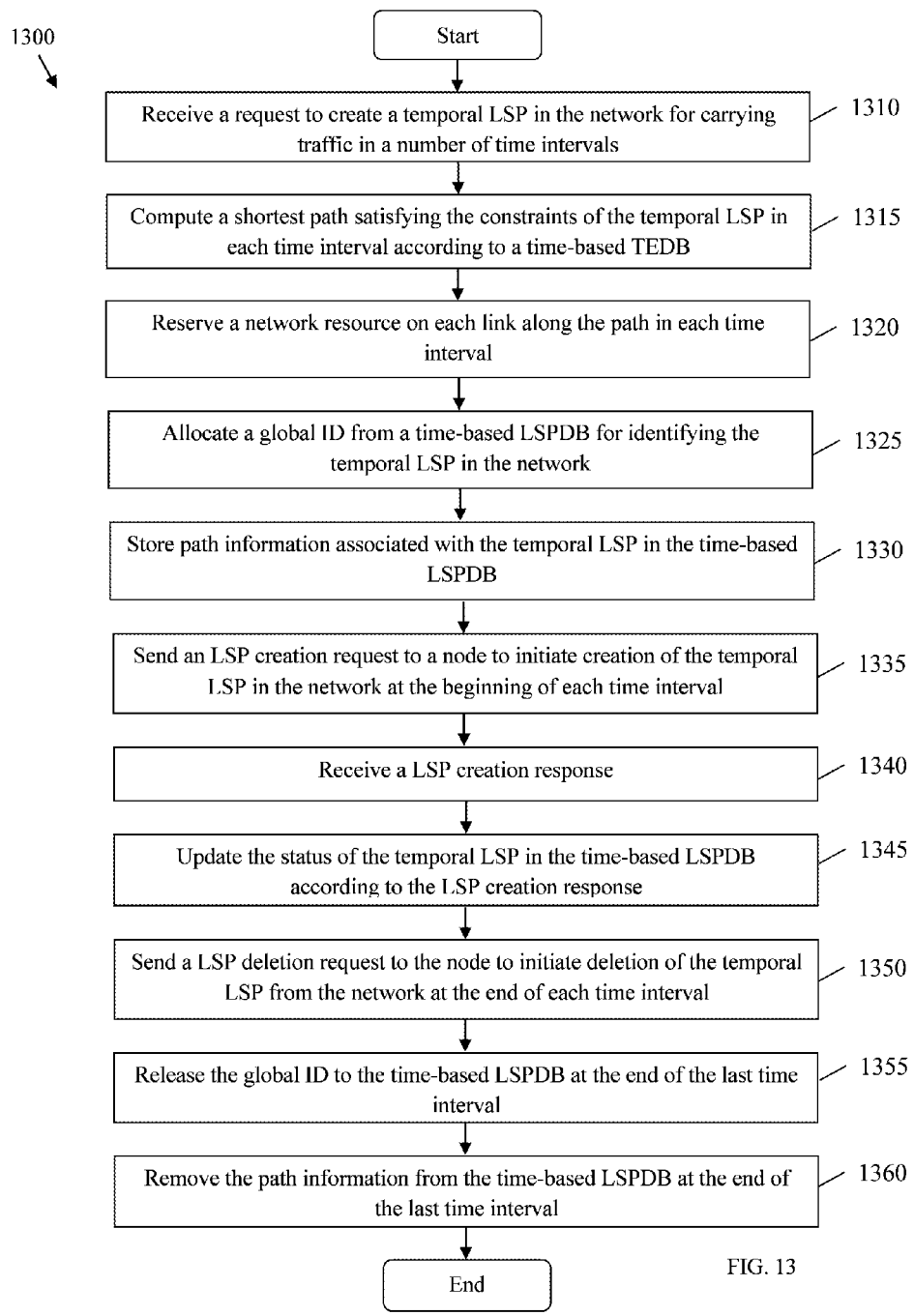
FIG. 13 is a flowchart of a method of creating a temporal LSP according to an embodiment of the disclosure.

FIG. 13 is a flowchart of a method 1300 of creating a temporal LSP such as the temporal LSPs 371 or 471 according to an embodiment of the disclosure. The method 1300 is implemented by the TTS controller 310, which may be implemented as the NE 500. The method 1300 employs similar temporal LSP creation mechanisms as described in the system 300 and the methods 700 or 900. The method 1300 is implemented when the network controller receives a request to create a temporal LSP. At step 1310, a request to create a temporal LSP in the network for carrying traffic in a number of time intervals is received, for example, from a user or an application. The request may indicate constraints of the temporal LSP, timing information about the time interval, and/or traffic information about the traffic. The constraints may include bandwidth, latency, wavelengths, QoS, and/or number of hops. The timing information may include a start time, an end time, a duration, and/or a repeat cycle, as described more fully below.

At step 1315, a shortest path satisfying the constraints of the temporal LSP in each time interval is computed according to a time-based TEDB such as the time-based TEDB 315, for example, using a CSPF-TTS unit such as the CSPF-TTS unit 311. The shortest path may be computed by employing a CSPF algorithm.

At step 1320, a network resource is reserved on each link along the path in each time interval from the time-based TEDB, for example, using a LSP manager such as the LSP manager 313. The reserved network resource may be represented by a profile similar to the profile 600.

At step 1325, a global ID is allocated or reserved from a time-based LSPDB such as the time-based LSPDB 316 for identifying the temporal LSP in the network, for example, using the LSP manager.

At step 1330, path information associated with the temporal LSP is stored in the time-based LSPDB.

At step 1335, a LSP creation request is sent to a node to initiate creation of the temporal LSP in the network at the beginning of each time interval, for example, using a protocol processing unit such as the protocol processing unit 314. When employing the IGP, the node is an egress node such as the edge node PE4 321 of the temporal LSP. When employing the PCEP, the node is a PCC on an ingress node such as the edge node PE1 321 of the temporal LSP. At step 1340, a LSP creation response is received from the node. For example, the LSP creation response may indicate a status of the temporal LSP.

At step 1345, the status of the temporal LSP in the time-based LSPDB is updated according to the received LSP creation response.

At step 1350, a LSP deletion request is sent to the node to initiate deletion of the temporal LSP from the network at the end of each time interval.

At step 1355, the global ID is released to the time-based LSPDB at the end of the last time interval. At step 1360, the path information is removed from the time-based LSPDB at the end of the last time interval. It should be noted that the method 1300 may be employed to create a temporal LSP with a single scheduled time interval or any number of scheduled time intervals. In addition, the method 1300 may be employed to create a temporal LSP in a domain controlled by the network controller when the temporal LSP is within a single domain or crosses multiple domains, as described more fully below.

Figure 14:
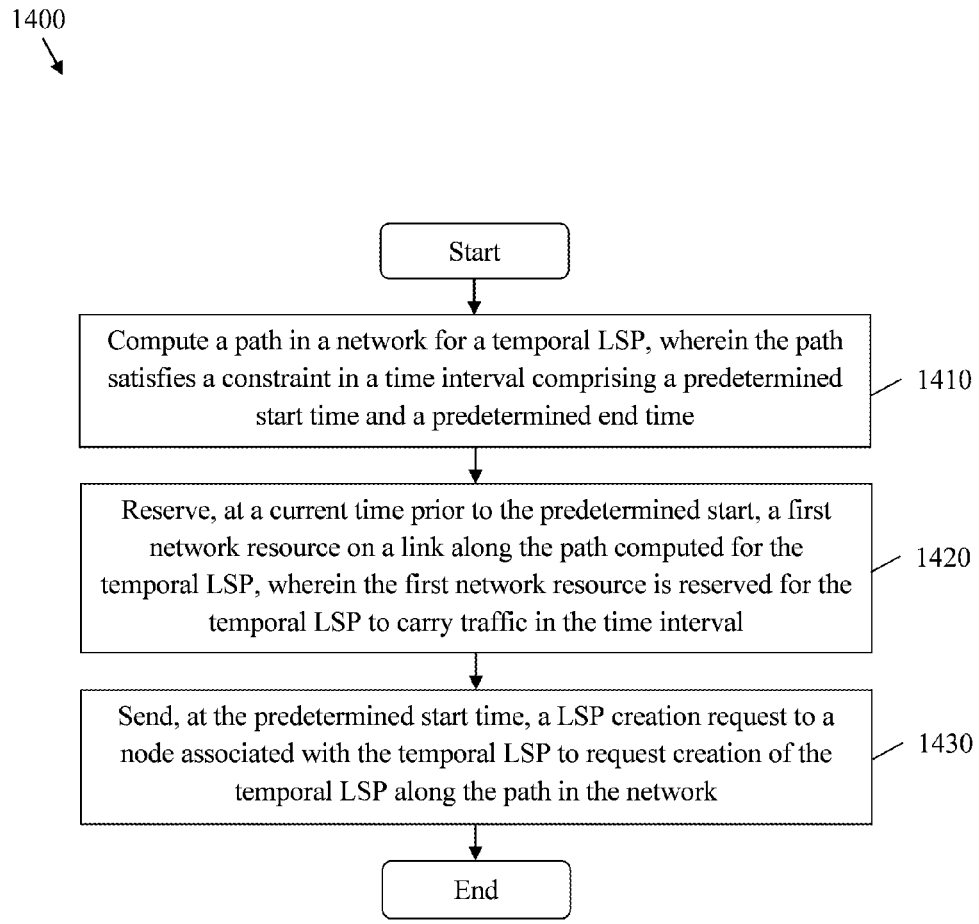
FIG. 14 is a flowchart of a method of creating a temporal LSP according to another embodiment of the disclosure.

FIG. 14 is a flowchart of a method 1400 of creating a temporal LSP such as the temporal LSPs 371 or 471 according to another embodiment of the disclosure. The method 1400 is implemented by the TTS controller 310, which may be implemented as the NE 500. The method 1400 employs similar temporal LSP creation mechanisms as described in the system 300 and the methods 700, 900, or 1300. The method 1400 is implemented when the network controller receives a request to create a temporal LSP. At step 1410, a path is computed in a network for a temporal LSP, for example, using a CSPF-TTS unit such as the CSPF-TTS unit 311 according to a time-based TEDB such as the time-based TEBD 315. The path satisfies a network constraint in a time interval comprising a predetermined start time and a predetermined end time. The constraint and the time interval may be indicated by the request. The constraint may include bandwidth, latency, and/or number of hops.

At step 1420, at a current time prior to the predetermined start, a first network resource is reserved on a link along the path computed for the temporal LSP, for example, using a LSP manager such as the LSP manager 313 from the time-based TEDB. The first network resource is reserved for the temporal LSP to carry traffic in the time interval.

At step 1430, at the predetermined start time, a LSP creation request is sent to a node associated with the temporal LSP to request creation of the temporal LSP along the path in the network. When employing the IGP, the node is an egress node such as the edge node PE4 321 of the temporal LSP. When employing the PCEP, the node is a PCC on an ingress node such as the edge node PE1 321 of the temporal LSP.

Figure 15:
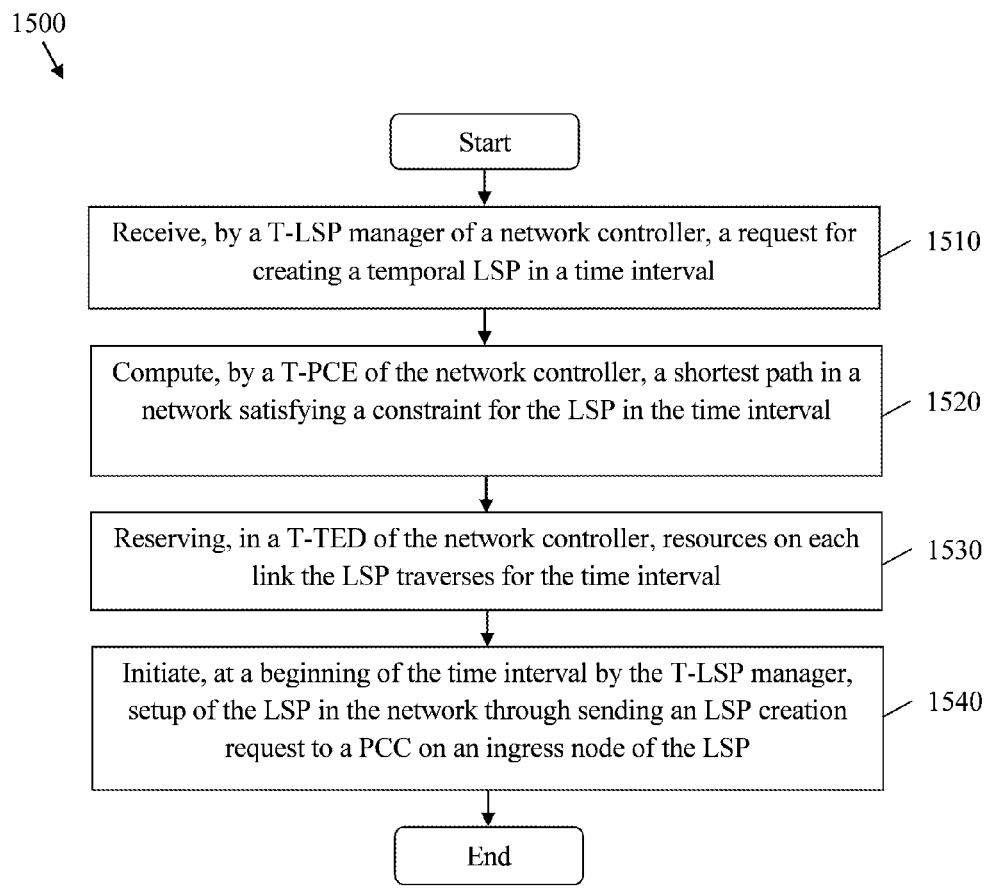
FIG. 15 is a flowchart of a method of creating a temporal LSP according to another embodiment of the disclosure.

FIG. 15 is a flowchart of a method 1500 of creating a temporal LSP such as the temporal LSPs 371 or 471 according to another embodiment of the disclosure. The method 1500 is implemented by the TTS controller 310, which may be implemented as the NE 500. The method 1500 employs similar temporal LSP creation mechanisms as described in the system 300 and the methods 700, 900, 1300, or 1400. The method 1500 is implemented when the network controller receives a request to create a temporal LSP. At step 1510, a request for creating a temporal LSP in a time interval is received by a T-LSP manager such as the LSP manager 313 of the network controller. The request may indicate constraints of the temporal LSP, timing information about the time interval, and/or traffic information about the traffic. The constraints may include bandwidth, latency, wavelengths, QoS, and/or number of hops. The timing information may include a start time, an end time, a duration, and/or a repeat cycle, as described more fully below.

At step 1520, a shortest path in a network satisfying a constraint for the LSP in the time interval is computed by a T-PCE such as the PCE-TTS unit 312 of the network controller.

At step 1530, resources are reserved in a T-TED such as the time-based TEDB 315 of the network controller on each of link the LSP traverses for the time interval.

At step 1540, at a beginning of the time interval, setup of the LSP is initiated in the network through sending a LSP creation request to a PCC on an ingress node of the LSP by the T-LSP manager.

Figure 16:
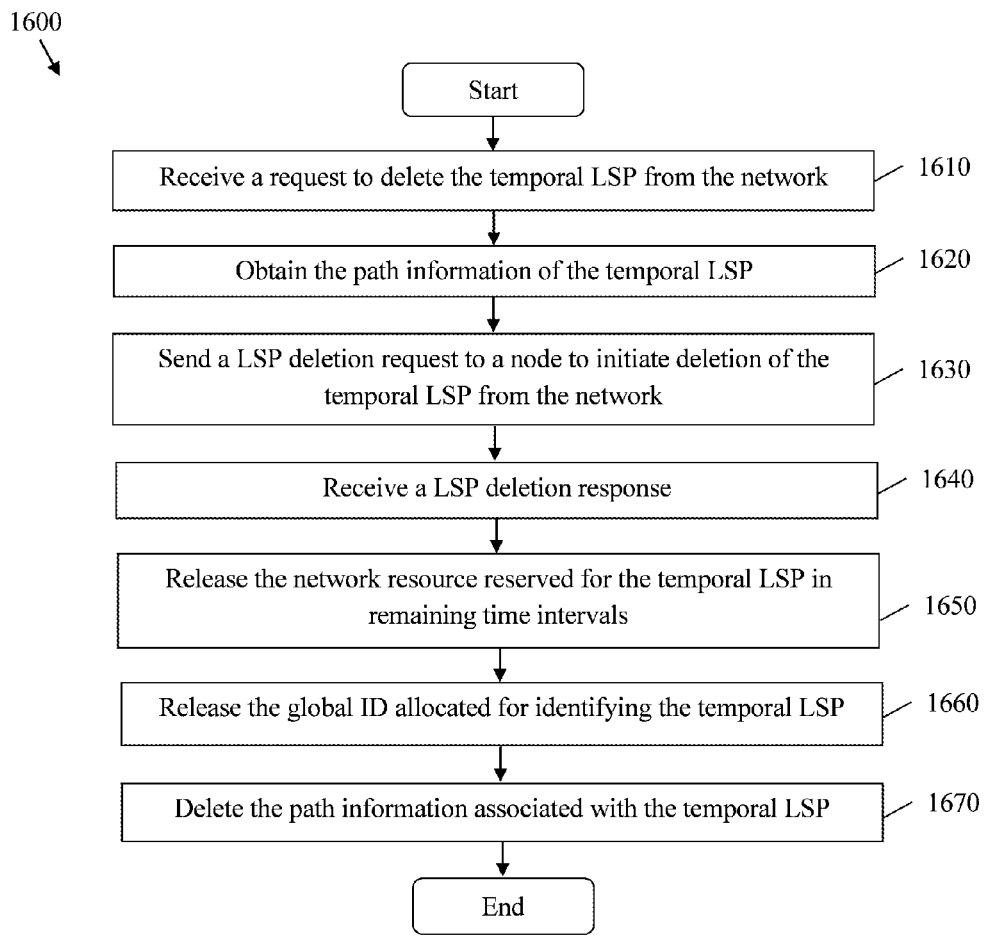
FIG. 16 is a flowchart of a method of deleting a temporal LSP according to an embodiment of the disclosure.

FIG. 16 is a flowchart of a method 1600 of deleting a temporal LSP such as the temporal LSPs 371 or 471 according to an embodiment of the disclosure. The method 1600 is implemented by the TTS controller 310, which may be implemented as the NE 500. The method 1600 employs similar temporal LSP deletion mechanisms as described in the system 300 and the methods 800 or 1000. The method 1600 is implemented after a temporal LSP is created for carrying traffic in a time interval, for example, by employing the methods 700, 800, 1300, 1400, or 1500. Network resources such as link bandwidths are reserved from a time-based TEDB such as the time-based TEDB 315 for the temporal to carry traffic LSP in one or more time intervals. A global ID is allocated from a time-based LSPDB such as the time-based LSPDB 316 for identifying the temporal LSP in the network and path information associated with the temporal LSP is stored in the time-based LSPDB.

At step 1610, a request to delete the temporal LSP from the network is received, for example, from a user or an application of the temporal LSP.

At step 1620, the path information of the temporal LSP is obtained, for example, by searching time-based LSPDB.

At step 1630, a LSP deletion request is sent to a node to initiate deletion of the temporal LSP from the network, for example, using a protocol processing unit such as the protocol processing unit 314. When employing the IGP, the node is an egress node such as the edge node PE4 321 of the temporal LSP. When employing the PCEP, the node is a PCC on an ingress node such as the edge node PE1 321 of the temporal LSP.

At step 1640, a LSP deletion response is received from the node, for example, indicating a status of the temporal LSP.

At step 1650, the network resource reserved for the temporal LSP in remaining time intervals is released to the time-based TEDB.

At step 1660, the global ID allocated for identifying the temporal LSP is released to the time-based LSPDB.

At step 1670, the path information associated with the temporal LSP is deleted from the time-based LSPDB. It should be noted that the method 1600 may be employed to delete a temporal LSP with a single scheduled time interval or any number of scheduled time intervals. In addition, the method 1600 may be employed to delete a temporal LSP in a domain controlled by the network controller when the temporal LSP is within a single domain or crosses multiple domains, as described more fully below.

Figure 17:
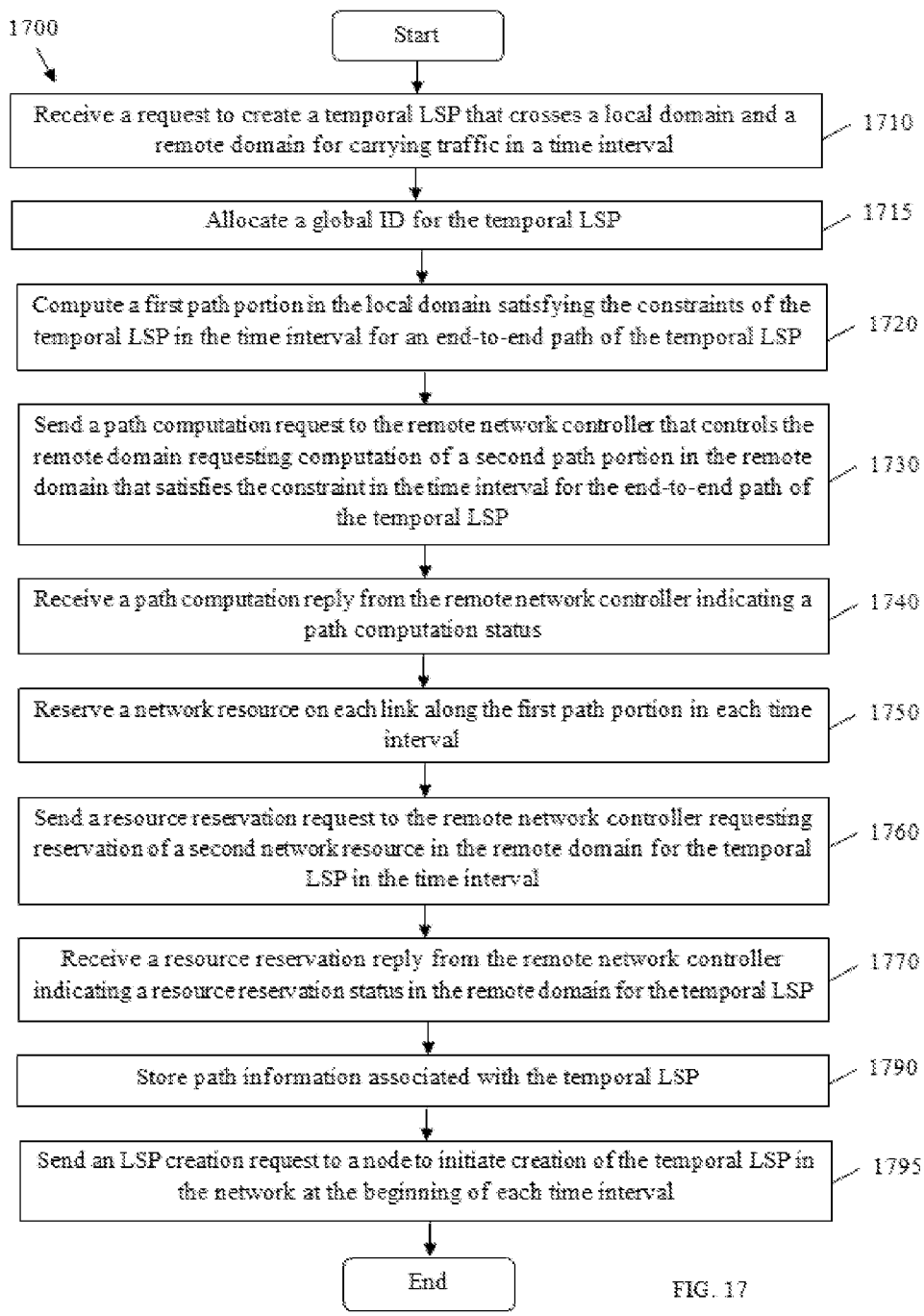
FIG. 17 is a flowchart of a method of creating a temporal LSP across multiple domains according to an embodiment of the disclosure.

FIG. 17 is a flowchart of a method 1700 of creating a temporal LSP such as the temporal LSP 471 across multiple domains according to an embodiment of the disclosure. The method 1700 is implemented by the TTS controller 310, which may be implemented as the NE 500. The method 1700 employs similar temporal LSP creation mechanisms as described in the system 300 and the methods 700, 900, 1100, 1300, 1400, or 1500. The method 1700 is implemented when the network controller receives a request to create a temporal LSP. At step 1710, a request to create a temporal LSP that crosses a local domain and a remote domain for carrying traffic in a number of time intervals is received, for example, from a user or an application. The local domain is controlled by the network controller. The remote domain is controlled by a remote network controller similar to the TTS controller 310. The request may indicate constraints of the temporal LSP, timing information about the time interval, and/or traffic information about the traffic. The constraints may include bandwidth, latency, wavelengths, QoS, and/or number of hops. The timing information may include a start time, an end time, a duration, and/or a repeat cycle, as describe more fully below. At step 1715, a global ID is allocated for the temporal LSP, for example, from a time-based LSPDB such as the time-based LSPDB 316. The information such as the constraints and the timing associated with the temporal LSP is stored in the time-based LSPDB 316.

At step 1720, a first path portion in the local domain satisfying the constraints of the temporal LSP in the time interval for an end-to-end path of the temporal LSP is computed, for example, using a PCE-TTS unit such as the PCE-TTS unit 312.

At step 1730, a path computation request is sent to the remote network controller that controls the remote domain. The path computation request requests computation of a second path portion in the remote domain that satisfies the constraint in the time interval for the end-to-end path of the temporal LSP. For example, the path computation request is sent by the PCE-TTS unit of the network controller to a remote PCE-TTS unit of the remote network controller.

At step 1740, a path computation reply is received from the remote network controller indicating a path computation status.

At step 1750, a network resource is reserved on each link along the first path portion in each time interval.

At step 1760, a resource reservation request is sent to the remote network controller requesting reservation of a second network resource in the remote domain for the temporal LSP in the time interval. For example, the resource reservation request is sent by the PCE-TTS unit of the network controller to the remote PCE-TTS unit of the remote network controller.

At step 1770, a resource reservation reply is received from the remote network controller indicating a resource reservation status in the remote domain for the temporal LSP.

At step 1790, path information associated with the temporal LSP is stored in the time-based LSPDB 316.

At step 1795, a LSP creation request is sent to a node to initiate creation of the temporal LSP in the network at the beginning of each time interval. When employing the IGP, the node is an egress node such as the edge node PE4 321 of the temporal LSP. When employing the PCEP, the node is a PCC on an ingress node such as the edge node PE1 321 of the temporal LSP. Subsequently, the network controller may notify the user or the application that the temporal LSP is created in the network. It should be noted that the method 1700 may be implemented in the order as shown or alternatively configured as determined by a person of ordinary skill in the art to achieve similar functionalities.

Figure 18:
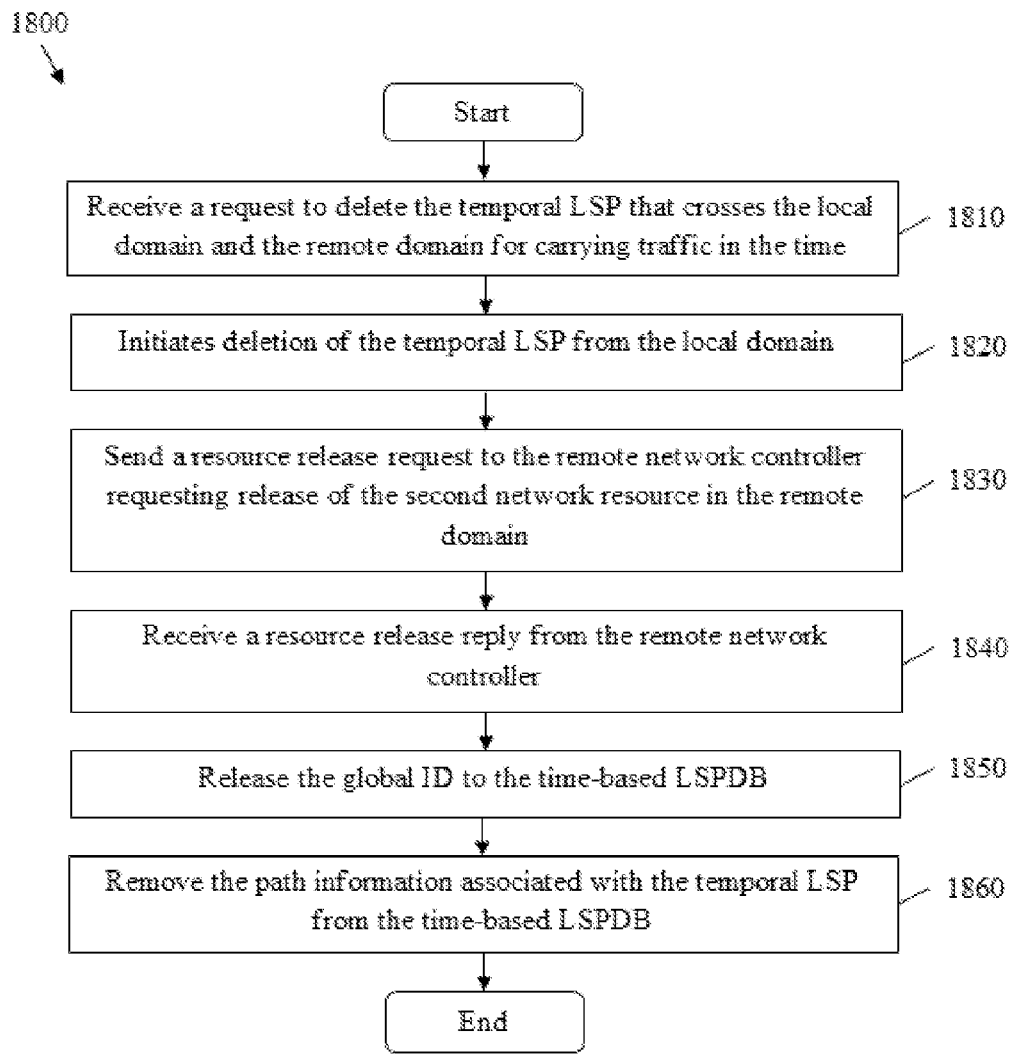
FIG. 18 is a flowchart of a method of deleting a temporal LSP that tunnels through multiple domains according to an embodiment of the disclosure.

FIG. 18 is a flowchart of a method 1800 of deleting a temporal LSP such as the temporal LSP 471 that tunnels through multiple domains according to an embodiment of the disclosure. The method 1800 is implemented by the TTS controller 310, which may be implemented as the NE 500. The method 1800 employs similar temporal LSP deletion mechanisms as described in the system 300 and the methods 800, 1000, 1200, or 1600. The method 1800 is implemented after a temporal LSP crossing multiple domains is created by employing the methods 700, 800, 1100, 1300, 1400, 1500, or 1700. For example, the temporal LSP traverses through a local domain controlled by the network controller and an interconnecting remote domain controlled by a remote network controller. The network controller reserved a resource such as link bandwidths from a time-based TEDB such as the time-based TEDB 315 for the temporal path to carry traffic of the LSP in one or more time intervals within the local domain. The network controller requested the remote network controller to reserve a resource in the remote domain for carrying the traffic of the LSP. The network controller allocated a global ID from a time-based LSPDB such as the time-based LSPDB 316 for the temporal LSP and stored path information of the temporal LSP in the time-based LSPDB.

At step 1810, a request is received to delete a temporal LSP that crosses the local domain and the remote domain for carrying traffic in the time interval, for example, from a user or an application of the temporal LSP.

At step 1820, deletion of the temporal LSP is initiated, for example, by employing similar mechanisms as the method 800, 1000, or 1600. A LSP deletion request is sent to a node to initiate deletion of the temporal LSP from the network, for example, using a protocol processing unit such as the protocol processing unit 314. When employing the IGP, the node is an egress node such as the edge node PE4 321 of the temporal LSP. When employing the PCEP, the node is a PCC on an ingress node such as the edge node PE1 321 of the temporal LSP.

At step 1830, a resource release request is sent to the remote network controller requesting release of the second network resource in the remote domain, for example, using a PCE-TTS unit such as the PCE-TTS unit 312 of the network controller to a remote PCE-TTS unit of the remote network controller.

At step 1840, a resource release reply is received from the remote network controller indicating a deletion status of the temporal LSP in the remote domain.

At step 1850, the global ID is released to the time-based LSPDB.

At step 1860, the path information associated with the temporal LSP is removed from the time-based LSPDB. Subsequently, the network controller may notify the user or the application that the temporal LSP is deleted from the network. It should be noted that the method 1800 may be implemented in the order as shown or alternatively configured as determined by a person of ordinary skill in the art to achieve similar functionalities.

Figure 19:
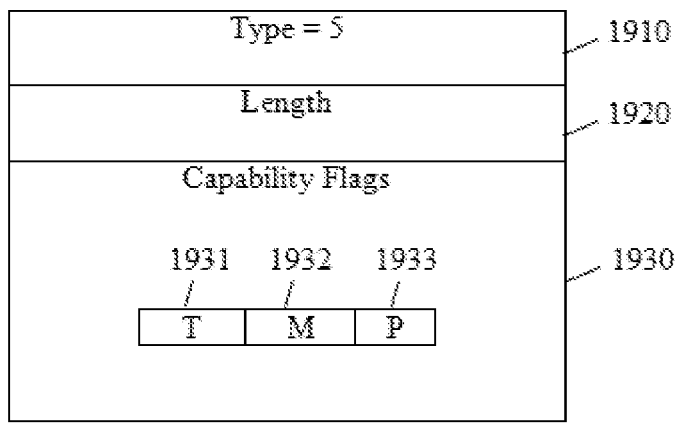
FIG. 19 is a schematic diagram illustrating a PCE capability flags sub-type-length-value (sub-TLV) according to an embodiment of the disclosure.

FIGS. 19-22 illustrate various embodiments of extensions to the IGP and the PCEP for facilitating creation and deletion of temporal LSPs such as the temporal LSPs 371 or 471. FIG. 19 is a schematic diagram illustrating a PCE capability flags sub-TLV 1900 according to an embodiment of the disclosure. The sub-TLV 1900 is employed by a PCE such as the PCE-TTS unit 312, 362, or 412 to advertise the PCE's path computation capabilities when employing the IGP. The sub-TLV 1900 is an extension to the PCE-CAP-FLAGS sub-TLV described in the IETF draft document Request For Comment (RFC) 5088. For example, the PCE-TTS unit sends a link state advertisement (LSA) comprising the sub-TLV 1900 during PCE discovery using open shortest path first (OSPF). The sub-TLV 1900 comprises a type field 1910, a length field 1920, and a PCE capability flags field 1930. The type field 1910 is about two octets long and is set to a value of five to indicate that the sub-TLV 1900 is a PCE-CAP-FLAGS sub-TLV. The length field 1920 is about two octets long and indicates a length of the PCE capability flags field 1930. For example, the length field 1920 indicates the length of the PCE capability flags 1930 in multiple of about four octets. The PCE capability flags field 1930 comprises a T flag 1931, an M flag 1932, and a P flag 1933. The T flag 1931 is about one bit long and indicates whether the PCE supports initiation of a temporal LSP for a given time interval. The M flag 1932 is about one bit long and indicates whether the PCE supports path computation for a temporal P2MP LSP in a given time interval. The P flag 1933 is about one bit long and indicates whether the PCE supports path computation for a temporal P2P LSP in a given time interval. The PCE capability flags field 1930 may comprise other flags as described in RFC 5088.

Figure 20:
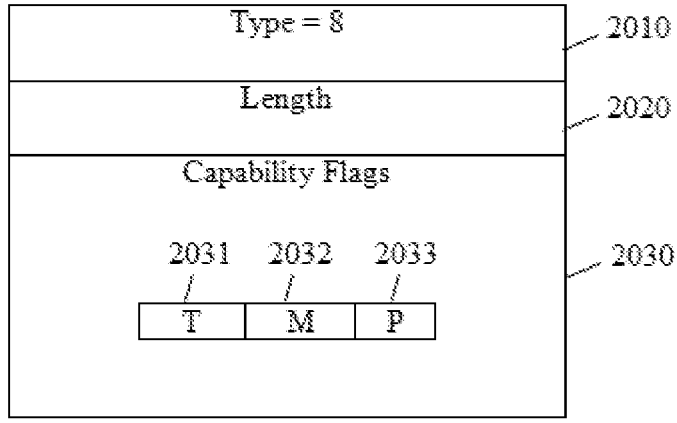
FIG. 20 is a schematic diagram illustrating an open message extension type-length-value (TLV) according to an embodiment of the disclosure.

FIG. 20 is a schematic diagram illustrating an open message extension TLV 2000 according to an embodiment of the disclosure. The TLV 2000 is employed by a PCE such as the PCE-TTS unit 312, 362, or 412 to exchange path computation capability information with other PCEs when employing the PCEP. For example, the PCE sends a PCEP open message comprising the TLV 2000 to another PCE during a PCEP session establishment, where the PCEP open message is described in the IETF draft document RFC 5440. The TLV 2000 comprises a type field 2010, a length field 2020, and a capability flags field 2030. The type field 2010 is about two octets long and is set to a value of eight to indicate that the TLV 2000 is an open message extension TLV. The length field 2020 is about two octets long and indicates a length of the capability flags field 2030. The capability flags field 2030 comprises a T flag 2031, an M flag 2032, and a P flag 2033. The T flag 2031 is about one bit long and indicates whether the PCE supports initiation of a temporal LSP for a given time interval. The M flag 2032 is about one bit long and indicates whether the PCE supports path computation for a temporal P2MP LSP in a given time interval. The P flag 2033 is about one bit long and indicates whether the PCE supports path computation for a temporal P2P LSP in a given time interval. The capability flags field 2030 may comprise other flags as described in the PCEP.

Figure 21:
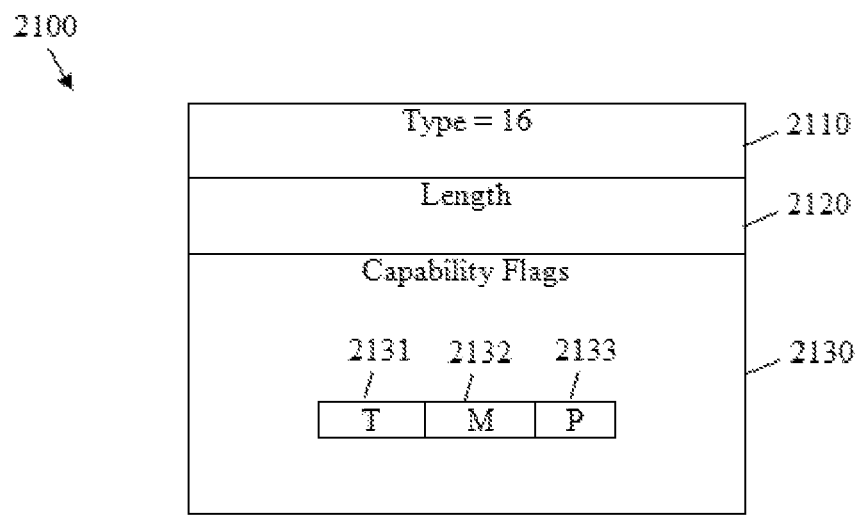
FIG. 21 is a schematic diagram illustrating a stateful PCE capability TLV according to an embodiment of the disclosure.

FIG. 21 is a schematic diagram illustrating a stateful PCE capability TLV 2100 according to an embodiment of the disclosure. The TLV 2100 is employed by a PCE such as the PCE-TTS unit 312, 362, and 412 to exchange path computation capability information with other PCEs when employing the PCEP. The TLV 2100 is an extension to the stateful PCE capability TLV described in the IETF draft document draft-ietf-pce-stateful-pce-14.txt. For example, the PCE sends a PCEP open message comprising the TLV 2100 to another PCE during a PCEP session establishment, where the PCEP open message is described in the IETF draft document RFC 5440. The TLV 2100 comprises a type field 2110, a length field 2120, and a capability flags field 2130. The type field 2110 is about two octets long and is set to a value of sixteen to indicate that the TLV 2100 is a stateful PCE capability TLV. The length field 2120 is about two octets long and indicates a length of the capability flags field 2130. The capability flags field 2130 comprises a T flag 2131, an M flag 2132, and a P flag 2133. The T flag 2131 is about one bit long and indicates whether the PCE supports initiation of a temporal LSP for a given time interval. The M flag 2132 is about one bit long and indicates whether the PCE supports path computation for a temporal P2MP LSP in a given time interval. The P flag 2133 is about one bit long and indicates whether the PCE supports path computation for a temporal P2P LSP in a given time interval. The capability flags field 2130 may comprise other flags as described in the PCEP.

Figure 22:
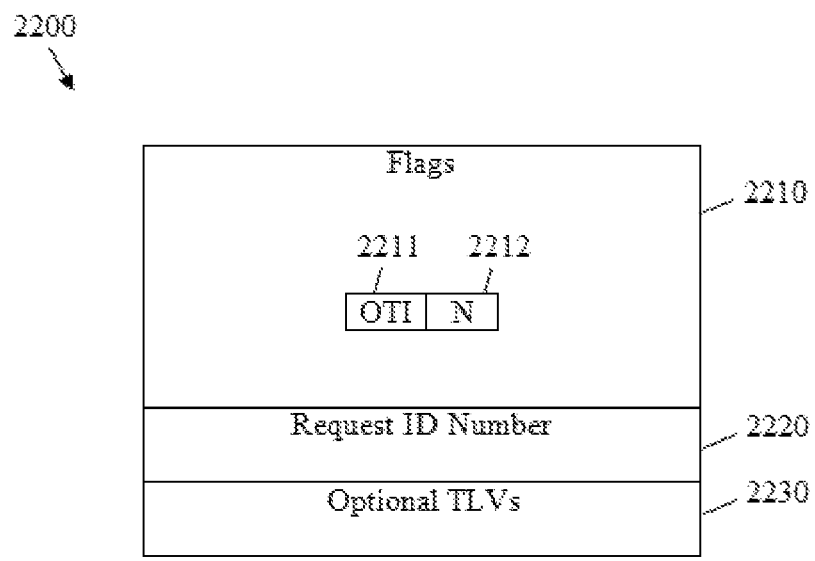
FIG. 22 is a schematic diagram illustrating a RP object according to an embodiment of the disclosure.

FIG. 22 is a schematic diagram illustrating an RP object 2200 according to an embodiment of the disclosure. The RP object 2200 is employed by a PCE such as the PCE-TTS unit 312, 362, or 412 to request other PCEs to compute paths, reserve resources, or release resources for a temporal LSP such as the LSPs 371 or 471 in predetermined time intervals. For example, the RP object 2200 may be included in a PCReq message or a PCRep message. The PCReq and PCRep messages are described in the IETF draft document draft-ietf-pce-stateful-pce-14.txt. The RP object 2200 is employed to indicate parameters related to a path computation request, a resource reservation request, or a resource release request. The RP object 2200 includes a flags field 2210, a request ID Number field 2220, and one or more optional TLVs 2230. The flags field 2210 is about four octets long. The flags field 2210 comprises an operation on time interval (OTI) flag 2211 and an N flag 2212.

The OTI flag 2211 is about three bits long. For example, the OTI flag 2211 is set to a value of one to indicate that a path computation request for a particular time interval, a value of two to indicate that a resource reservation request for a particular time interval, or a value of three to indicate that a resource release request for a particular time interval. The N flag 2212 is about one bit long. For example, the N flag 2212 is set to a value of zero to indicate that the request is for a P2P LSP or a value of one to indicate that the request is for a P2MP LSP. Thus, the OTI flag and the N flag 2212 may be combined request path computation, resource reservation, or resource releases for a temporal P2P LSP or a temporal P2MP LSP for a particular time interval. The request ID number field 2220 is about four octets long and indicates an identifier for the request. The optional TLV 2230 is variable in length and may include TLVs related to the request.

Figure 23:
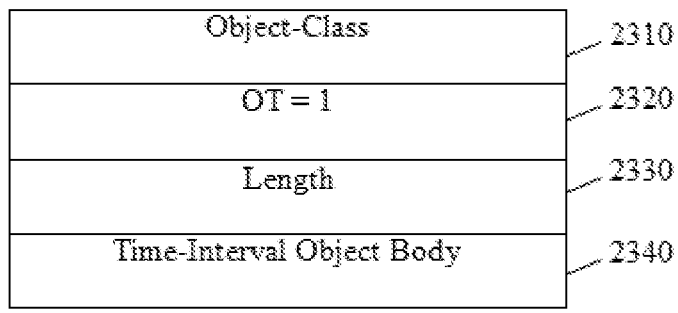
FIG. 23 is a schematic diagram illustrating a time-interval object according to an embodiment of the disclosure.

FIG. 23 is a schematic diagram illustrating a time-interval object 2300 according to an embodiment of the disclosure. The time-interval object 2300 is employed by a PCE such as the PCE-TTS unit 312, 362, or 412 to indicate scheduled time intervals for temporal LSPs such as the LSPs 371 and 471. The time-interval object 2300 may be included in a PCReq message, a PCRep message, a PCInitiate message, or a PCRpt message. The PCInitiate and PCRpt messages are described in IETF document draft-ietf-pce-pce-initiated-lsp-04. The time-interval object 2300 is similar to a PCEP object as described in the PCEP. The time-interval object 2300 comprises an object-class field 2310, an object type (OT) field 2320, a length field 2330, and a time-interval object Body field 2340. The object-class field 2310 is about one octet long and indicates a time-interval object-class. For example, the object-class field 2310 may be set to a value of 16 to indicate that the time-interval object 2300 is a time interval object. The object-type field 2320 is about one octet long and indicates a time-interval object-type. The length field 2330 is about two octets long and indicates the length of the time-interval object body field 2340. The time-interval object body field d 2340 is variable in length and may comprise one or more TLVs associated with one or more time intervals employed for path computation as described more fully below.

Figure 24:
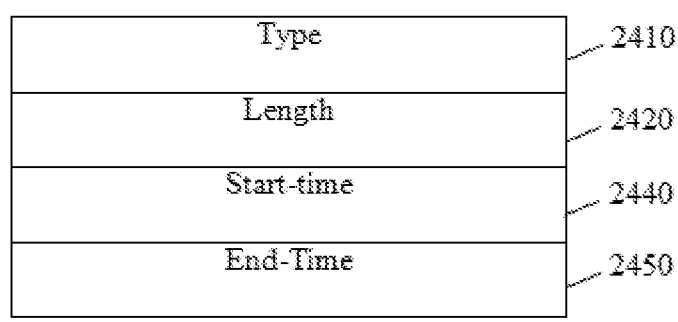
FIG. 24 is a schematic diagram illustrating an absolute time interval TLV according to an embodiment of the disclosure.

FIG. 24 is a schematic diagram illustrating an absolute time interval TLV 2400 according to an embodiment of the disclosure. The absolute time interval TLV 2400 is employed by a PCE such as the PCE-TTS unit 312, 362, and 412 to indicate scheduled time intervals for temporal LSPs such as the LSPs 371 and 471. The absolute time interval TLV 2400 may be included in a time-interval object 2300 of a PCReq message, a PCRep message, a PCInitiate message, and a PCRpt message. The absolute time interval TLV 2400 comprises a type field 2410, a length field 2420, a Start-time field 2440, and an End-time field 2450. The type field 2410 is about two octets long and indicates that the time interval TLV 2400 is an absolute time interval TLV. The length field 2420 is about two octets long and indicates a length of the absolute time interval TLV 2400.

The start-time field 2440 is about four octets long and indicates an absolute time, denoted as Ta, when a LSP is scheduled to start carrying traffic. The end-time field 2450 is about four octets long and indicates an absolute time, denoted as Tb, when the LSP is scheduled to stop carrying traffic. Thus, the scheduled time interval is from Ta to Tb. The absolute time Ta and Tb are clock times that are synchronized among all nodes such as the edge nodes 121, 321, and 421 and all internal nodes such as the internal nodes 122, 322, and 422 in a network such as the systems 100, 300, or 400.

Figure 25:
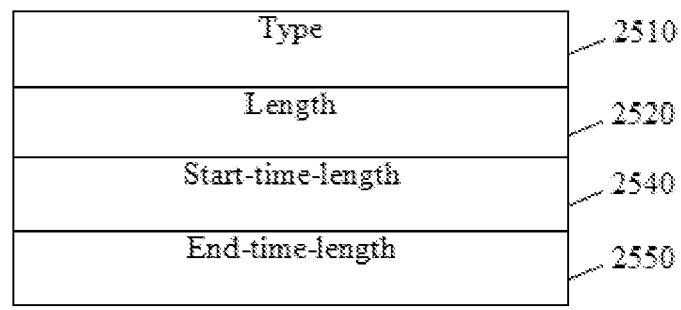
FIG. 25 is a schematic diagram illustrating a relative time interval TLV according to an embodiment of the disclosure.

FIG. 25 is a schematic diagram illustrating a relative time interval TLV 2500 according to an embodiment of the disclosure. The relative time interval TLV 2500 is employed by a PCE such as the PCE-TTS unit 312, 362, or 412 to indicate scheduled time intervals for temporal LSPs such as the LSPs 371 or 471. The relative time interval TLV 2500 may be included in a time-interval object 2300 of a PCReq message, a PCRep message, a PCInitiate message, or a PCRpt message. The relative time interval TLV 2500 comprises a type field 2510, a length field 2520, a start-time-length field 2540, and an end-time-length field 2550. The type field 2510 is about two octets long and indicates that the time interval TLV 2500 is a relative time interval TLV. The length field 2520 is about two octets long and indicates a length of the relative time interval TLV 2500.

The start-time-length field 2540 is about four octets long and indicates a time duration in some time units such as seconds from a current local time to a time that a LSP starts to carry traffic. The end-time-length field 2550 is about four octets long and indicates a time duration in some time units such as seconds from a current local time to a time that the LSP stops carrying traffic. For example, the time interval is a time period from a first time, denoted as Ta, to a second time, denoted as Tb. Then, the start-time-length field 2540 indicates a start time length of Ta—the current local time, and the end-time-length field 2550 indicates an end time length of Tb—the current local time.

Figure 26:
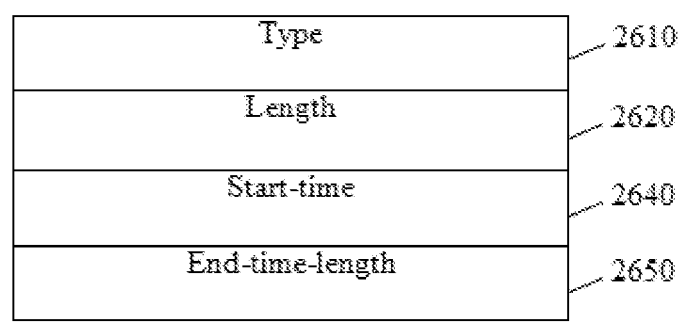
FIG. 26 is a schematic diagram illustrating a combined time interval TLV according to an embodiment of the disclosure.

FIG. 26 is a schematic diagram illustrating a combined time interval TLV 2600 according to an embodiment of the disclosure. The combined time interval TLV 2600 is employed by a PCE such as the PCE-TTS unit 312, 362, or 412 to indicate scheduled time intervals for temporal LSPs such as the LSPs 371 or 471. The combined time interval TLV 2600 may be included in a time-interval object 2300 of a PCReq message, a PCRep message, a PCInitiate message, or a PCRpt message. The combined time interval TLV 2600 comprises a type field 2610, a length field 2620, a start-time field 2640, and an end-time-length field 2650. The type field 2610 is about two octets long and indicates that the time interval TLV 2600 is a combined time interval TLV. The length field 2620 is about two octets long and indicates a length of combined time interval TLV 2600. The start-time field 2640 is similar to the start-time field 2440. The end-time-length field 2650 is similar to the end-time-length field 2550.

Figure 27:
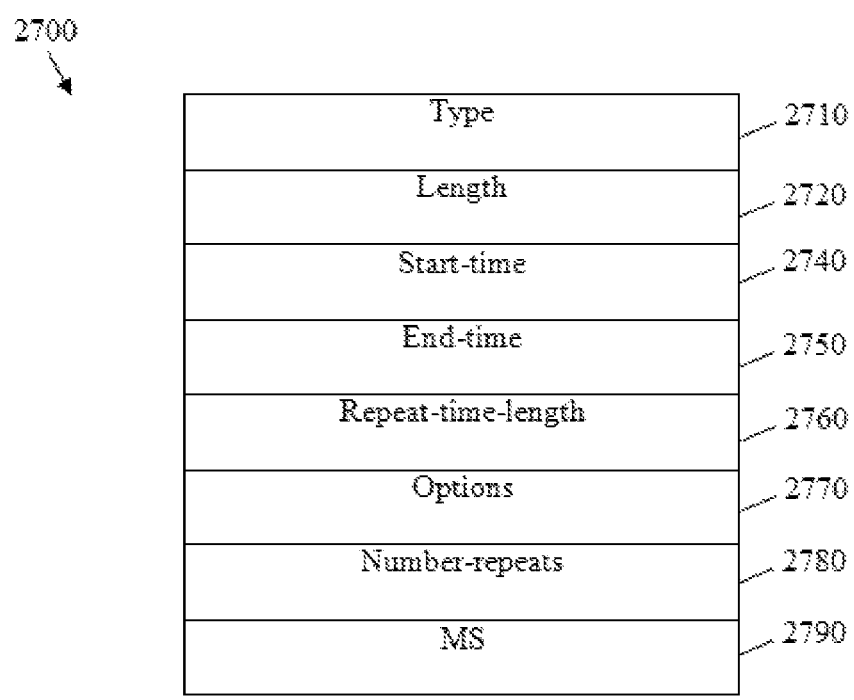
FIG. 27 is a schematic diagram illustrating a recurrent absolute time interval TLV according to an embodiment of the disclosure.

FIG. 27 is a schematic diagram illustrating a recurrent absolute time interval TLV 2700 according to an embodiment of the disclosure. The recurrent absolute time interval TLV 2700 is employed by a PCE such as the PCE-TTS unit 312, 362, or 412 to indicate scheduled time intervals for temporal LSPs such as the LSPs 371 or 471. The recurrent absolute time interval TLV 2700 may be included in a time-interval object 2300 of a PCReq message, a PCRep message, a PCInitiate message, or a PCRpt message. The recurrent absolute time interval TLV 2700 comprises a type field 2710, a length field 2720, a start-time field 2740, an end-time field 2750, a repeat-time-length field 2760, an options field 2770, a number-repeat field 2780, and a millisecond (MS) field 2790. The type field 2710 is about two octets long and indicates that the time interval TLV 2700 is a recurrent absolute time interval TLV. The length field 2720 is about two octets long and indicates a length of recurrent absolute time interval TLV 2700. The start-time field 2740 is similar to the start-time fields 2440 and 2640. The end-time-length field 2750 is similar to the end-time-length field 2450.

The repeat-time-length field 2760 is about four octets long and indicates a time duration in seconds between the start of each time interval at which a LSP is scheduled for carrying to traffic. The options field 2770 is about one octet long and indicates a repeat duration. For example, the options field 2770 may be set to a value of one to indicate a per day repeat cycle. The options field 2770 may be set to a value of two to indicate a per week repeat cycle. The options field 2770 may be set to a value of three to indicate a per month repeat cycle. The options field 2770 may be set to a value of four to indicate a per year repeat cycle. The options field 2770 may be set to a value of five to indicate a repeat cycle according to the repeat-time-length field 2760. The number-repeats field 2780 is about three octets long and indicates a number of repeats for the scheduled time interval. It should be noted that the repeat-time-length field 2760 is valid when the options field 2770 is set to a value of five. The MS field is about one octet long and indicates a time extension for extending the duration indicated in the repeat-time-length field 2760 in milliseconds.

Figure 28:
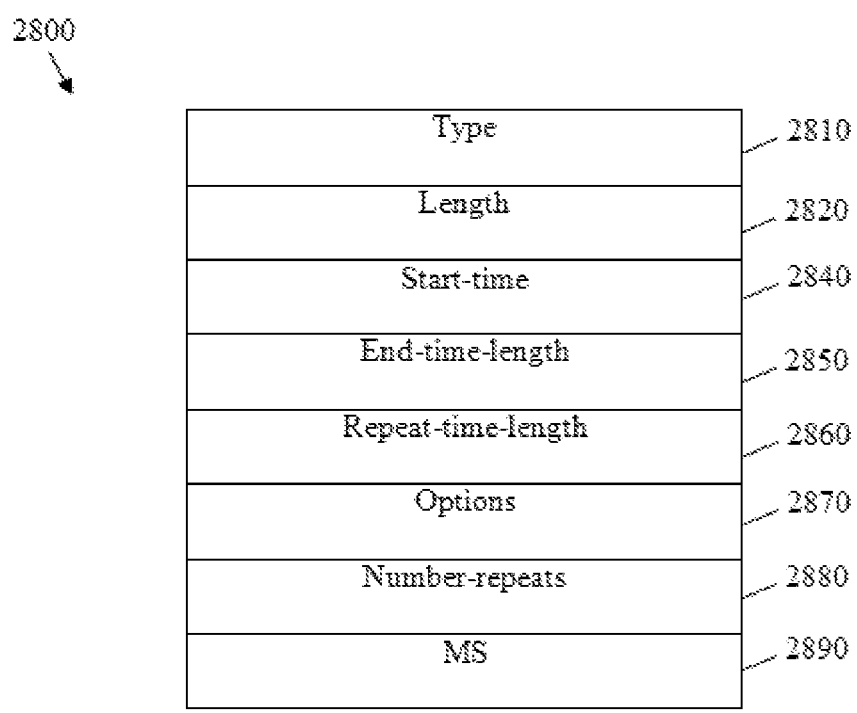
FIG. 28 is a schematic diagram illustrating a recurrent combined time interval TLV according to an embodiment of the disclosure.

FIG. 28 is a schematic diagram illustrating a recurrent combined time interval TLV 2800 according to an embodiment of the disclosure. The recurrent combined time interval TLV 2800 is employed by a PCE such as the PCE-TTS unit 312, 362, or 412 to indicate scheduled time intervals for temporal LSPs such as the LSPs 371 or 471. The recurrent combined time interval TLV 2800 may be included in a time-interval object 2300 of a PCReq message, a PCRep message, a PCInitiate message, or a PCRpt message. The recurrent combined time interval TLV 2800 comprises a type field 2810, a length field 2820, a start-time field 2840, an end-time-length field 2850, a repeat-time-length field 2860, an options field 2870, a number-repeat field 2880, and an MS field 2890. The type field 2810 is about two octets long and indicates that the time interval TLV 2800 is a recurrent combined time interval TLV. The length field 2820 is about two octets long and indicates a length of the recurrent combined time interval TLV 2800. The start-time field 2840 is similar to the start-time fields 2440, 2640, and 2740. The end-time-length field 2850 is similar to the end-time-length fields 2550 and 2650. The repeat-time-length field 2860 is similar to the repeat-time-length field 2760. The options field 2870 is similar to the options field 2770. The number-repeats field 2880 is similar to the number-repeats field 2780. The MS field 2890 is similar to the MS field 2790.

Figure 29:
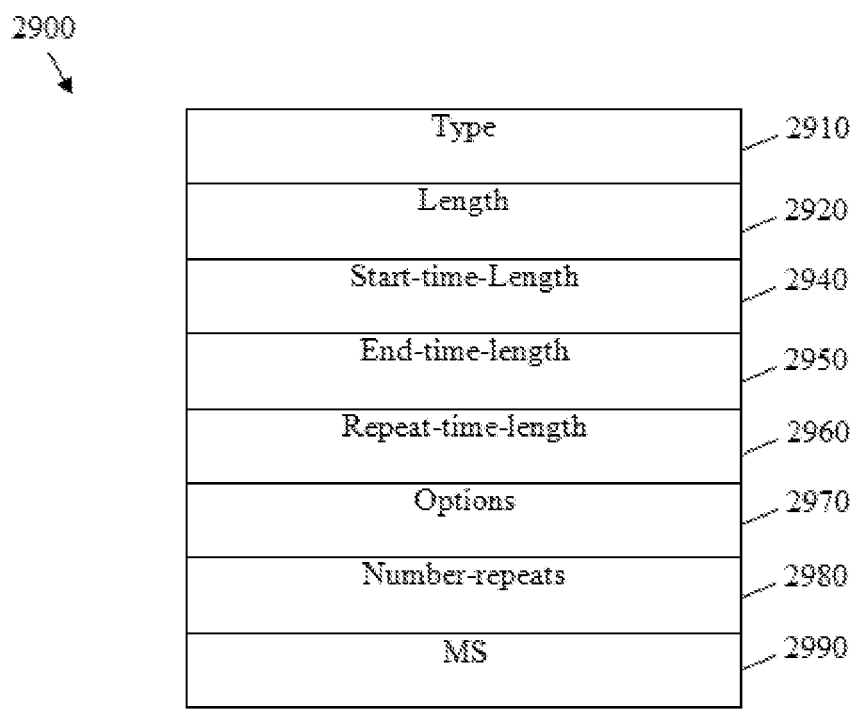
FIG. 29 is a schematic diagram illustrating a recurrent relative time interval TLV according to an embodiment of the disclosure.

FIG. 29 is a schematic diagram illustrating a recurrent relative time interval TLV 2900 according to an embodiment of the disclosure. The recurrent relative time interval TLV 2900 is employed by a PCE such as the PCE-TTS unit 312, 362, or 412 to indicate scheduled time intervals for temporal LSPs such as the LSPs 371 or 471. The recurrent relative time interval TLV 2900 may be included in a time-interval object 2300 of a PCReq message, a PCRep message, a PCInitiate message, or a PCRpt message. The recurrent relative time interval TLV 2900 comprises a type field 2910, a length field 2920, a start-time-length field 2940, an end-time-length field 2950, a repeat-time-length field 2960, an options field 2970, a number-repeat field 2980, and an MS field 2990. The type field 2910 is about two octets long and indicates that the time interval TLV 2900 is a recurrent relative time interval TLV. The length field 2920 is about two octets long and indicates a length of the recurrent relative time interval TLV 2900. The start-time-length field 2940 is similar to the start-time-length fields 2540 and 2640. The end-time-length field 2950 is similar to the end-time-length fields 2550 and 2650. The repeat-time-length field 2960 is similar to the repeat-time-length field 2760. The options field 2970 is similar to the options field 2770. The number-repeats field 2980 is similar to the number-repeats field 2780. The MS field 2990 is similar to the MS field 2790.

In an embodiment of LSP creation, the PCInitiate message comprises a stateful request parameters (SRP) object, a LSP object, an end-points object, an explicit route object (ERO) object, and a time interval object such as the time-interval object 2300, which may comprise a time interval TLV such as the time interval TLVs 2400, 2500, 2600, 2700, or 2800. The SRP object, the LSP object, the end-point object, and the ERO object are as described in the IETF draft documents RFC 5440 and ietf-pce-pce-initiated-lsp-05.txt. The SRP object comprises a SRP-ID-number. The LSP object comprises a PLSP-ID set of 0 and a SYMBOLIC-PATH-NAME TLV indicating a path name. The end-points object comprises the source and the destination addresses of the temporal LSP. The ERO object comprises the path of the temporal LSP.

In such an embodiment, the PCRpt message comprises an SRP object, a LSP object, an ERO object, and a time interval object such as the time-interval object 2300, which may comprise a time interval TLV such as the time interval TLVs 2400, 2500, 2600, 2700, or 2800. The SRP object comprises the SRP-ID-number in the corresponding PCInitiate message. The LSP object comprises a PLSP-ID assigned to the temporal LSP by the PCC, a SYMBOLIC-PATH-NAME TLV indicating a path name, and a creation (C) flag set to a value of one to indicate that the temporal LSP is created by the LSP creation request. The ERO object comprises the path of the temporal LSP.

In an embodiment of LSP deletion, the PCInitiate message comprises a SRP object, a LSP object, and a time interval object such as the time-interval object 2300, which may comprise a time interval TLV such as the time interval TLVs 2400, 2500, 2600, 2700, or 2800. The SRP object and the LSP object are as described in the IETF draft documents RFC 5440 and ietf-pce-pce-initiated-lsp-05.txt. The SRP object comprises a SRP-ID-number and an R flag set to a value of one to indicate a LSP deletion request. The LSP object comprises a PLSP-ID (e.g., a global ID) of the temporal LSP.

In such an embodiment, the PCRpt message comprises an SPR object and a LSP object. The SRP object comprises the SRP-ID-number in the corresponding LSP deletion request. The LSP object comprises a R flag set to a value of one to indicate the temporal LSP is removed from the PCC, and a LSP identifiers TLV.

In an embodiment, an NE includes means for computing a path in a network for a temporal LSP, wherein the path satisfies a constraint in a time interval comprising a predetermined start time and a predetermined end time, means for reserving, at a current time prior to the predetermined start time via the processor, a first network resource on a link along the path computed for the temporal LSP, wherein the first network resource is reserved for the temporal LSP to carry traffic in the time interval, and means for sending, at the predetermined start time via a transmitter of the NE, a LSP creation request to a node associated with the temporal LSP to request creation of the temporal LSP along the path in the network.

In another embodiment, an NE includes means for receiving, by a T-LSP manager of a network controller, a request for creating a temporal LSP in a time interval, means for computing, by a T-PCE of the network controller, a shortest path in a network satisfying a constraint for the LSP in the time interval, means for reserving, in a T-TED of the network controller, resources on each link the LSP traverses for the time interval, and means for initiating, at a beginning of the time interval by the T-LSP manager, setup of the LSP in the network through sending a LSP creation request to a PCC on an ingress node of the LSP.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method implemented by a network element (NE) configured as a temporal tunnel service (TTS) controller, comprising:
   receiving, using a receiver of the NE, a creation request to create a temporal label switched path (LSP) in a network for carrying traffic in a scheduled time interval, the creation request indicating a constraint, a predetermined start time of the scheduled time interval, and a predetermined end time of the scheduled time interval;
   computing, using a processor of the NE, a path in the network for the temporal LSP satisfying the constraint in the scheduled time interval, with the computing being performed in response to receiving the creation request;
   reserving, at a current time prior to the predetermined start time using the processor, a network resource on a link along the path computed for the temporal LSP, the network resource being reserved for the temporal LSP to carry traffic in the scheduled time interval; and
   sending, at the predetermined start time using a transmitter of the NE, a LSP creation request to a node associated with the temporal LSP to request creation of the temporal LSP along the path in the network in response to reserving the network resource on the link along the path computed for the temporal LSP.

2. The method of claim 1, further comprising sending, at the predetermined end time using the transmitter, a LSP deletion request to the node associated with the temporal LSP to request deletion of the temporal LSP from the network.

3. The method of claim 1, wherein the creation request further indicates that the scheduled time interval is a recurring time interval, wherein computing the path in the network comprises determining that the path satisfies the constraint in each recurring time interval, wherein reserving the network resource comprises reserving the network resource on the link for each recurring time interval, wherein sending the LSP creation request comprises sending the LSP creation request at a beginning of each recurring time interval, and wherein the method further comprises sending, at an end of each recurring time interval a LSP deletion request to the node to request deletion of the temporal LSP from the network.

4. The method of claim 1, further comprising:
   allocating, using the processor, a global identifier (ID) for identifying the temporal LSP in the network; and
   storing, in a memory of the NE, path information associated with the temporal LSP, wherein the path information indicates at least one of the global ID, the network resource, the scheduled time interval, a node sequence of the path, or a status of the temporal LSP.

5. The method of claim 4, further comprising:
   receiving, using the receiver of the NE, a deletion request to delete the temporal LSP from the network;
   sending, using the transmitter, a LSP deletion request to the node requesting deletion of the temporal LSP from the network;
   receiving, using the receiver, a LSP deletion response from the node indicating a deletion status of the temporal LSP;
   releasing, using the processor, the network resource reserved on the link for the temporal LSP;
   releasing, using the processor, the global ID allocated for identifying the temporal LSP; and
   deleting, from the memory, the path information associated with the temporal LSP.

6. The method of claim 1, wherein the LSP creation request is sent using an interior gateway protocol (IGP), wherein the node is an egress node of the temporal LSP, and wherein the method further comprises receiving a LSP creation response from an ingress node of the temporal LSP indicating a creation status of the temporal LSP.

7. The method of claim 1, wherein the LSP creation request is sent using a path computation element (PCE) communication protocol (PCEP), wherein the LSP creation request is a PCEP path computation LSP initiate request (PCInitiate) message, wherein the node is a path computation client (PCC) associated with the temporal LSP, and wherein the method further comprises receiving a PCEP LSP state report (PCRpt) message from the PCC indicating a creation status of the temporal LSP.

8. The method of claim 1, wherein the network operates under a local domain, wherein the temporal LSP crosses the local domain and a remote domain, wherein the path is a first path portion of an end-to-end path of the temporal LSP, and wherein the method further comprises:
   sending, using the transmitter, a path computation request to a remote network controller that controls the remote domain requesting computation of a second path portion in the remote domain that satisfies the constraint in the scheduled time interval for the end-to-end path of the temporal LSP;
   receiving, using the receiver of the NE, a path computation reply from the remote network controller indicating the second path portion;
   sending, using the transmitter, a resource reservation request to the remote network controller requesting reservation of a second network resource in the remote domain for the temporal LSP in the scheduled time interval; and
   receiving, using the receiver, a resource reservation reply from the remote network controller indicating a resource reservation status.

9. The method of claim 1, wherein the network operates under a local domain, wherein the temporal LSP crosses the local domain and a remote domain, wherein the path is a first path portion of an end-to-end path of the temporal LSP, and wherein the method further comprises:
   sending, via the transmitter, a path computation request to a remote network controller that controls the remote domain requesting computation of a second path portion in the remote domain that satisfies the constraint in the scheduled time interval for the end-to-end path of the temporal LSP;
   receiving, via the receiver of the NE, a path computation reply from the remote network controller indicating the second path portion;
   sending, via the transmitter, a resource reservation request to the remote network controller requesting reservation of a second network resource in the remote domain for the temporal LSP in the scheduled time interval; and
   receiving, via the receiver, a resource reservation reply from the remote network controller indicating a resource reservation status.

10. The network controller of claim 9, further comprising a memory coupled to the processor and configured to store a time-based traffic engineering database (TEDB) comprising resource information associated with the link by first time intervals, wherein the network resource is reserved from the time-based TEDB.

11. The network controller of claim 10, wherein the memory is further configured to store a time-based LSP database (LSPDB), and wherein the processor is further configured to:
   allocate a global identifier (ID) from the time-based LSPDB for identifying the temporal LSP in the network; and
   store path information associated with the temporal LSP in the time-based LSPDB, wherein the path information includes at least one of the global ID, the network resource, the scheduled time interval, a node sequence of the path, or a status of the temporal LSP.

12. The network controller of claim 11, further comprising a receiver coupled to the processor and configured to receive a deletion request to delete the temporal LSP from the network, wherein the transmitter is further configured to send the LSP deletion request to the node requesting deletion of the temporal LSP from the network in response to the deletion request, and wherein the processor is further configured to:
   release the network resource reserved on the link for the temporal LSP to the time-based TEDB;
   release the global ID allocated for identifying the temporal LSP to the time-based LSPDB; and
   delete the path information associated with the temporal LSP from the time-based LSPDB.

13. The network controller of claim 9, wherein the network operates under a local domain, wherein the temporal LSP crosses the local domain and a remote domain, wherein the path comprises a first path portion of an end-to-end path of the temporal LSP, wherein the transmitter is further configured to:
   send a path computation request to a remote network controller associated with the remote domain requesting computation of a second path portion in the remote domain that satisfies the constraint in the scheduled time interval for the end-to-end path of the temporal LSP; and
   send a resource reservation request to the remote network controller requesting reservation of a second network resource in the remote domain for the temporal LSP in the scheduled time interval, and
   wherein the network controller further comprises a receiver coupled to the processor and configured to:
   receive a path computation reply from the remote network controller indicating the second path portion in response to the path computation request; and
   receive a resource reservation reply from the remote network controller indicating a resource reservation status in response to the resource reservation request.

14. The network controller of claim 9, wherein the the computer executable instructions that when executed by the processor further cause the processor to send, at the predetermined end time, a LSP deletion request to the node to request deletion of the temporal LSP from the network.

15. A non-transitory computer readable medium configured to store a computer program product comprising computer executable instructions that when executed by a processor of a temporal tunnel service (TTS) controller cause the processor to:
   receive a creation request to create a temporal label switched path (LSP) in a network for carrying traffic in a scheduled time interval, the creation request indicating a constraint, a predetermined start time of the scheduled time interval, and a predetermined end time of the scheduled time interval;

compute a path in the network for the temporal LSP satisfying the constraint in the scheduled time interval, with the computing being performed in response to receiving the creation request; and reserve, at a current time prior to the predetermined start time, a network resource on a link along the path computed for the temporal LSP, the network resource being reserved for the temporal LSP to carry traffic in the scheduled time interval; and send, at the predetermined start time, a LSP creation request to a node associated with the temporal LSP to request creation of the temporal LSP along the path in the network in response to reserving the network resource on the link along the path computed for the temporal LSP.

16. A non-transitory computer readable medium of claim 15, wherein the computer executable instructions that when executed by the processor further cause the processor to send, at the predetermined end time using the transmitter, a LSP deletion request to the node associated with the temporal LSP to request deletion of the temporal LSP from the network.

17. The non-transitory computer readable medium of claim 15, wherein the creation request further indicates that the scheduled time interval is a recurring time interval, wherein the computer executable instructions that when executed by the processor further cause the processor to determine that the path satisfies the constraint in each recurring time interval, wherein the computer executable instructions that when executed by the processor further cause the processor to reserve the network resource on the link for each recurring time interval, wherein the computer executable instructions that when executed by the processor further cause the processor to send the LSP creation request at a beginning of each recurring time interval, and wherein the computer executable instructions that when executed by the processor further cause the processor to send, at an end of each recurring time interval, a LSP deletion request to the node to request deletion of the temporal LSP from the network.

18. The non-transitory computer readable medium of claim 15, wherein the computer executable instructions, when executed by the processor, further cause the processor to:

allocate a global identifier (ID) for identifying the temporal LSP in the network; and store path information associated with the temporal LSP, wherein the path information indicates at least one of the global ID, the network resource, the scheduled time interval, a node sequence of the path, or a status of the temporal LSP.

19. The non-transitory computer readable medium of claim 15, wherein the LSP creation request is sent using an interior gateway protocol (IGP), wherein the node is an egress node of the temporal LSP, and wherein the computer executable instructions that when executed by the processor further cause the processor to receive a LSP creation response from an ingress node of the temporal LSP indicating a creation status of the temporal LSP.

* * * * *

UNITED STATES PATENT AND TRADEMARK OFFICE
CERTIFICATE OF CORRECTION

PATENT NO. : 10,547,543 B2
APPLICATION NO. : 15/187384
DATED : January 28, 2020
INVENTOR(S) : Huaimo Chen et al.

It is certified that error appears in the above-identified patent and that said Letters Patent is hereby corrected as shown below:

In the Claims

Column 35, delete Lines 40-61, Claim 9, and replace with the following claim:
9. A network controller comprising:
 a receiver configured to receive a creation request to create a temporal label switched path (LSP) in a network for carrying traffic in a scheduled time interval, the creation request indicating a constraint, a predetermined start time of the scheduled time interval, and a predetermined end time of the scheduled time interval;
 a processor coupled to the receiver and configured to:
  compute a path in the network for the temporal LSP satisfying the constraint in the scheduled time interval, with the computing being performed in response to receiving the creation request; and
  reserve, at a current time prior to the predetermined start time, a network resource on a link along the path computed for the temporal LSP, the network resource being reserved for the temporal LSP to carry traffic in the scheduled time interval; and
 a transmitter coupled to the processor and configured to:
  send, at the predetermined start time, a LSP creation request to a node associated with the temporal LSP to request creation of the temporal LSP along the path in the network in response to reserving the network resource on the link along the path computed for the temporal LSP.

Signed and Sealed this
Seventeenth Day of March, 2020

Andrei Iancu
*Director of the United States Patent and Trademark Office*